US010978243B2

(12) United States Patent
Tonomura et al.

(10) Patent No.: US 10,978,243 B2
(45) Date of Patent: Apr. 13, 2021

(54) POWER CIRCUIT, IRON CORE FOR SCOTT CONNECTED TRANSFORMER, SCOTT CONNECTED TRANSFORMER, AND SUPERHEATED STEAM GENERATOR

(71) Applicant: TOKUDEN CO., LTD., Kyoto (JP)

(72) Inventors: Toru Tonomura, Otsu (JP); Sachio Tamaki, Kyoto (JP); Yasuhiro Fujimoto, Kyoto (JP)

(73) Assignee: TOKUDEN CO., LTD., Kyoto (JP)

( * ) Notice: Subject to any disclaimer, the term of this patent is extended or adjusted under 35 U.S.C. 154(b) by 551 days.

(21) Appl. No.: 15/452,425

(22) Filed: Mar. 7, 2017

(65) Prior Publication Data

US 2017/0178801 A1 Jun. 22, 2017

Related U.S. Application Data

(62) Division of application No. 14/444,746, filed on Jul. 28, 2014.

(30) Foreign Application Priority Data

Dec. 20, 2013 (JP) .............................. JP2013-263904
Dec. 20, 2013 (JP) .............................. JP2013-263905
Dec. 20, 2013 (JP) .............................. JP2013-263906

(51) Int. Cl.
*H01F 27/42* (2006.01)
*H01F 27/24* (2006.01)
(Continued)

(52) U.S. Cl.
CPC .......... *H01F 27/425* (2013.01); *F22B 1/282* (2013.01); *F22G 1/165* (2013.01); *H01F 3/10* (2013.01);
(Continued)

(58) Field of Classification Search
CPC .... H01F 27/425; H01F 27/24; H01F 27/2455; H01F 27/263; H01F 30/12
See application file for complete search history.

(56) References Cited

U.S. PATENT DOCUMENTS 2,246,239 A 6/1941 Brand
3,195,081 A * 7/1965 Kunes ................... H01F 41/024
336/5
(Continued)

FOREIGN PATENT DOCUMENTS

CN 1529331 A 9/2004
CN 102334178 A 1/2012
(Continued)

OTHER PUBLICATIONS

United States Patent and Trademark Office, Office Action Issued in U.S. Appl. No. 14/444,746, dated Apr. 11, 2019, 12 pages.
(Continued)

*Primary Examiner* — Elvin G Enad
*Assistant Examiner* — Malcolm Barnes
(74) *Attorney, Agent, or Firm* — Alleman Hall Creasman & Tuttle LLP

(57) ABSTRACT

The present invention allows individual control of an output voltage of a main transformer and an output voltage of a teaser transformer while utilizing output characteristics of the respective transformer when a Scott connected transformer has control equipment arranged on the input side thereof, including first control equipment arranged in one of two phases of the main transformer on the input side in order to control a voltage or a current and second control equipment arranged in one end of a primary coil of the teaser transformer on the input side in order to control a voltage or a current, the control equipment controlling an output volt-
(Continued)

age of the main transformer and an output voltage of the teaser transformer individually.

5 Claims, 13 Drawing Sheets

(51) Int. Cl.
| | |
|---|---|
| H01F 30/14 | (2006.01) |
| H01F 3/10 | (2006.01) |
| H01F 27/26 | (2006.01) |
| F22B 1/28 | (2006.01) |
| F22G 1/16 | (2006.01) |
| H02M 5/257 | (2006.01) |
| H01F 27/245 | (2006.01) |
| H01F 30/12 | (2006.01) |

(52) U.S. Cl.
CPC ......... *H01F 27/24* (2013.01); *H01F 27/2455* (2013.01); *H01F 27/26* (2013.01); *H01F 27/263* (2013.01); *H01F 30/12* (2013.01); *H01F 30/14* (2013.01); *H02M 5/2573* (2013.01)

(56) References Cited

U.S. PATENT DOCUMENTS

| | | | | |
|---|---|---|---|---|
| 3,278,825 A | * | 10/1966 | Haas, Jr. | H02M 7/068 363/2 |
| 3,328,738 A | * | 6/1967 | Broverman | H01F 30/14 336/215 |
| 3,684,991 A | * | 8/1972 | Trump | H01F 27/324 336/70 |
| 4,085,603 A | * | 4/1978 | Vanek | H01F 27/25 29/605 |
| 4,464,559 A | | 8/1984 | Greene | |
| 4,571,487 A | | 2/1986 | Offerman | |
| 4,631,471 A | * | 12/1986 | Fouad | G05F 3/06 323/306 |
| 4,833,583 A | | 5/1989 | Petitimbert | |
| 5,660,749 A | | 8/1997 | Taguchi et al. | |
| 5,861,792 A | * | 1/1999 | Ueda | H01F 27/245 336/212 |
| 5,977,761 A | | 11/1999 | Bilger et al. | |
| 6,317,021 B1 | * | 11/2001 | Jansen | H01F 27/24 336/155 |
| 6,586,915 B1 | | 7/2003 | Reeves et al. | |
| 8,693,854 B2 | | 4/2014 | Yoshimoto et al. | |
| 10,510,480 B2 | | 12/2019 | Tonomura et al. | |
| 2003/0029859 A1 | | 2/2003 | Knoot et al. | |
| 2005/0030140 A1 | * | 2/2005 | Dahlgren | H01F 30/12 336/5 |
| 2012/0045190 A1 | | 2/2012 | Yoshimoto et al. | |
| 2013/0314196 A1 | * | 11/2013 | Azegami | H01F 27/25 336/213 |
| 2014/0286068 A1 | * | 9/2014 | Allaert | H01F 30/06 363/131 |
| 2015/0180361 A1 | | 6/2015 | Tonomura et al. | |
| 2015/0206652 A1 | | 7/2015 | Duval | |
| 2016/0262212 A1 | | 9/2016 | Tonomura | |
| 2016/0278167 A1 | | 9/2016 | Tonomura | |
| 2017/0178801 A1 | | 6/2017 | Tonomura et al. | |
| 2017/0179839 A1 | | 6/2017 | Tonomura et al. | |
| 2017/0179840 A1 | | 6/2017 | Tonomura et al. | |

FOREIGN PATENT DOCUMENTS

| | | |
|---|---|---|
| CN | 202206315 U | 4/2012 |
| CN | 102918618 A | 2/2013 |
| EP | 2610885 A1 | 7/2013 |
| JP | 28007008 Y | 7/1953 |
| JP | 38022910 B | 10/1963 |
| JP | 44025020 B | 10/1969 |
| JP | S50039717 U1 | 4/1975 |
| JP | S50161623 A | 12/1975 |
| JP | S52025216 U1 | 2/1977 |
| JP | S52103670 A | 8/1977 |
| JP | S53116176 A | 10/1978 |
| JP | S53150416 U1 | 11/1978 |
| JP | S54101348 U1 | 7/1979 |
| JP | S54101433 U1 | 7/1979 |
| JP | S59067915 U1 | 5/1984 |
| JP | 61228608 A * | 10/1986 ............ H01F 37/00 |
| JP | S61228608 A | 10/1986 |
| JP | S61248508 A | 11/1986 |
| JP | 2001297867 A | 10/2001 |
| JP | 2003299361 A | 10/2003 |
| JP | 2007129135 A | 5/2007 |
| JP | 2009088422 A | 4/2009 |
| JP | 2009105253 A | 5/2009 |
| JP | 2009283159 A | 12/2009 |
| JP | 2010071624 A | 4/2010 |
| JP | 2011082387 A | 4/2011 |
| JP | 2011155079 A | 8/2011 |
| JP | 2012163229 A | 8/2012 |
| JP | 2012163230 A | 8/2012 |
| JP | 2013128057 A | 6/2013 |
| JP | 2013247208 A | 12/2013 |
| JP | 5641578 B | 12/2014 |
| JP | 2015122346 A | 7/2015 |
| JP | 2015135231 A | 7/2015 |
| KR | 20120090808 A | 8/2012 |
| TW | 201243243 A | 11/2012 |

OTHER PUBLICATIONS

Taiwan Intellectual Property Office, Office Action and Search Report Issued in Application No. 107113822, dated May 15, 2018, 4 pages.
Taiwan Intellectual Property Office, Office Action and Search Report Issued in Application No. 107113823, dated May 15, 2018, 4 pages.
Taiwan Intellectual Property Office, Office Action and Search Report Issued in Application No. 107113821, dated May 25, 2018, 6 pages.
The State Intellectual Property Office of the People's Republic of China, First Office Action Issued in Chinese Application No. 201410367031.0, dated Feb. 13, 2018, 14 pages. (Submitted with English Translation of First Office Action).
European Patent Office, Partial European Search Report Issued in Application No. 14178753.1, dated May 12, 2015, Germany, 8 pages.
Japan Patent Office, Decision to Grant a Patent (Notice of Allowance) Issued in Japanese Application No. 2013263906, dated Sep. 7, 2017, 4 pages.
"Corporate Profile & Product Information (4)," Tokuden Co. Ltd., Japan Tappi (Technical Association of the Pulp and Paper Industry) Journal, vol. 67, No. 8, Aug. 2013, 11 pages. (Submitted with English Translation).
Japan Patent Office, Decision to Grant a Patent (Notice of Allowance) Issued in Japanese Application No. 2013-263904, dated Dec. 5, 2017, 5 pages. (Submitted with English Translation).
Japan Patent Office, Decision to Grant a Patent (Notice of Allowance) Issued in Japanese Application No. 2014-257354, dated Jan. 18, 2018, 5 pages. (Submitted with English Translation).
United States Patent and Trademark Office, Office Action Issued in U.S. Appl. No. 14/444,746, dated Oct. 18, 2018, 30 pages.
United States Patent and Trademark Office, Office Action Issued in U.S. Appl. No. 15/452,368, dated Apr. 24, 2020, 40 pages.
Korean Intellectual Property Office, Office Action Issued in Application No. 10-2014-0093900, dated Jun. 2, 2020, Korea, 7 Pages. (Submitted with English-Language Summary).
Korean Intellectual Property Office, Office Action Issued in Application No. 10-2014-0093900, dated Dec. 1, 2020, Korea, 4 Pages.

\* cited by examiner

POWER CIRCUIT, IRON CORE FOR SCOTT CONNECTED TRANSFORMER, SCOTT CONNECTED TRANSFORMER, AND SUPERHEATED STEAM GENERATOR

CROSS-REFERENCE TO RELATED APPLICATION

The present application is a divisional of U.S. patent application Ser. No. 14/444,746 filed Jul. 28, 2014, entitled "Power circuit, iron core for Scott connected transformer, Scott connected transformer, and superheated steam generator," which claims priority to Japanese Patent Application Nos. JP2013263904, JP2013263905 and JP2013263906 all filed Dec. 20, 2013, the entire contents of which are incorporated herein by reference.

TECHNICAL FIELD

The present invention relates to a power circuit using a Scott connected transformer, a Scott connected transformer made of a main transformer and a teaser transformer, iron cores used for the Scott connected transformer, and a superheated steam generator using the Scott connected transformer.

BACKGROUND ART

In a power supply device using a Scott connected transformer made of a main transformer and a teaser transformer, it is considered to provide control elements to control a voltage or a current in each of three phases of the Scott connected transformer on the primary side in order to control an output voltage of the main transformer and an output voltage of the teaser transformer.

Because a current flowing through a primary coil of the teaser transformer also flows into a primary coil of the main transformer, even with the arrangement of control elements in three phases of the Scott connected transformer on the primary side, individual control of output voltages in two single-phase circuits is not possible.

Due to the above reason, a general method is to control output voltages in two single-phase circuits individually by providing a control element in each of two single-phase circuits respectively in order to control a voltage and/or a current therein.

However, if a load connected to a single-phase circuit has low resistance, the single-phase circuit becomes a large current circuit where arrangement of control circuit is difficult practically. Therefore, a configuration as shown in FIG. 13 is adopted where control elements are arranged in two single-phase circuits that are made of Scott connected transformers and two sets of single-phase transformers are further arranged to transform outputs of the two single-phase circuits to low-voltage large currents. That is, this method requires a total of three sets of transformers including one set of Scott connected transformers and two sets of single-phase transformers.

CITATION LIST

Patent Literature

Patent Literature 1 JPA S61-248508

SUMMARY OF INVENTION

Technical Problem

The present invention aims at solving the above problem and its main object is to provide a simplified configuration of a power supply device using a Scott connected transformer and allow individual control of an output voltage of a main transformer and an output voltage of a teaser transformer while utilizing circuit characteristics of the Scott connected transformer.

Solution to Problem

A power supply device according to the present invention is a power circuit having a Scott connected transformer made of a main transformer and a teaser transformer, first control equipment provided in one of two phases of the main transformer on the input side in order to control a voltage or a current, and second control equipment provided in one end of a primary coil of the teaser transformer on the input side in order to control a voltage or a current, wherein the first control equipment and the second control equipment control an output voltage of the main transformer and an output voltage of the teaser transformer individually in a state of being connected to a load requiring an output voltage of $k \times n1/n2$ or more in the main transformer relative to an output voltage of the teaser transformer, where $n1$ is a number of turns of a secondary coil of the main transformer, $n2$ is a number of turns of a secondary coil of the teaser transformer and k is a coefficient obtained from the exciting impedance of the main transformer and the exciting impedance of the teaser transformer.

A method for a power supply device according to the present invention has a Scott connected transformer made of a main transformer and a teaser transformer, first control equipment provided in one of two phases of the main transformer on the input side in order to control a voltage or a current, and second control equipment provided in one end of a primary coil of the teaser transformer on the input side in order to control a voltage or a current. The method may comprise obtaining a coefficient k from the exciting impedance of the main transformer and the exciting impedance of the teaser transformer, and controlling an output voltage of the main transformer and an output voltage of the teaser transformer individually in a state of being connected to a load requiring an output voltage of $k \times n1/n2$ or more in the main transformer relative to an output voltage of the teaser transformer, where $n1$ is a number of turns of a secondary coil of the main transformer, and $n2$ is a number of turns of a secondary coil of the teaser transformer.

Here, the primary coil of the teaser transformer is connected to a center point of a primary coil of the main transformer and a current flows into the primary coil of the main transformer from the primary coil of the teaser transformer, wherein an output voltage of the main transformer remains at a prescribed ratio relative to an output voltage of the teaser transformer even when the first control equipment of the main transformer is set to restrict the flow to the minimum. Here, an output voltage of the main transformer is $(k \times n1/n2)$ times an output voltage of the teaser transformer where $n1$ is a number of turns of the secondary coil of the main transformer, $n2$ is a number of turns of the secondary coil of the teaser transformer, and k is a coefficient obtained from the exciting impedance of the main transformer and the exciting impedance of the teaser transformer. The exciting impedance is also determined by the length of magnetic path, magnetic flux density, gap length and turns, etc. More specifically, the coefficient k is obtained from the ratio of the exciting impedance of the teaser transformer obtained when the first control equipment is cut off and the exciting impedance of the main transformer obtained when turns of the primary coil of the main transformer are halved.

Accordingly, in a state where a load requiring an output voltage of k×n1/n2 or more in the main transformer relative to an output voltage of the teaser transformer is connected, the first control equipment provided in one of two phases of the main transformer on the input side and the second control equipment provided in the teaser transformer on the input side can control an output voltage of the main transformer and an output voltage of the teaser transformer individually. The device configuration can also be simplified because it is unnecessary to arrange two single-phase output circuits in the main transformer and the teaser transformer on the output side according to a conventional method.

The secondary coil of the main transformer and the secondary coil of the teaser transformer desirably have the same turns.

At this time, when k is 0.66 as an example, connection to a load that requires an output voltage of 0.66 or more in the main transformer relative to an output voltage of the teaser transformer is assumed. When impedance of a load connected to a single-phase output circuit (i.e. secondary coil) of the main transformer is the same as impedance of a load connected to a single-phase output circuit (i.e. secondary coil) of the teaser transformer, a load capacity of the single-phase output circuit of the main transformer is conditioned to be 0.44 ($\approx 0.66^2$) or more relative to a load capacity of the single-phase output circuit of the teaser transformer.

At least one of the main transformer and the teaser transformer is desirably a single-wound transformer.

By thus providing the primary coil and the secondary coil in single-wound connection, insulation between the primary coil and the secondary coil can be simplified to allow easy fabrication and reduction of accident risk.

It is desirable that the iron core of the main transformer and the iron core of the teaser transformer are formed integrally.

This can make the device compact by using one set of transformers instead of two sets thereof to constitute the Scott connected transformer.

It is desirable that at least one of the main transformer and the teaser transformer has a leg iron core with a substantially circular cross section and a yoke iron core made of a deformed wound iron core connected to the leg iron core at the top and bottom. Here, as the leg iron core with a substantially circular cross section, it is possible to consider a cylindrical involute iron core formed cylindrically by radially laminating multiple magnetic steel sheets having curvatures curved into an involute shape.

This configuration provides the leg iron core with a substantially circular cross section and therefore realizes the shortest outer circumferential length in comparison with a rectangular iron core having the same cross-sectional area, thus reducing the amount of a coil to use. Because the yoke iron core is made of a deformed wound iron core, an abutting part to the leg iron core with a substantially circular cross section can be easily formed into the same circular shape.

It is desirable that the Scott connected transformer has two main leg iron cores around which Scott connected induction coils are wound, a common leg iron core serving as a common path for magnetic fluxes generated in the two main leg iron cores, and a yoke iron core to connect the two main leg iron cores and the common leg iron core at the top and bottom, wherein the two main leg iron cores and the common leg iron core are positioned to serve as vertexes of a triangle in a plan view and the yoke iron core is bent at the common leg iron core as a bending point in a plan view.

This allows positioning the two leg iron cores and the common leg iron core to serve as vertexes of a triangle in a plan view, and bending the yoke iron core at the common leg iron core as a bending point in the plan view, thereby reducing the distance between the two main leg iron cores and reducing the width dimension of the iron cores as a whole to achieve space reduction.

The distance between one of the two main leg iron cores and the common leg iron core is desirably equal to the distance between the other main leg iron core and the common leg iron core.

This makes the length of a magnetic path between one of the main leg iron core and the common leg iron core equal to the length of a magnetic path between the other main leg iron core and the common leg iron core and thus provides mutual equivalent magnetic characteristics in the two main leg iron cores, thereby efficient conversion from the three-phase power supply to two single-phase circuits can be realized.

The superheated steam generator according to the present invention is also characterized by having a Scott connected transformer made of a main transformer and a teaser transformer, a first heating conductor tube that is electrically heated by the output of the main transformer in order to generate saturated steam from water, and a second heating conductor tube that is electrically heated by the output of the teaser transformer in order to generate heated steam from the saturated steam generated by the first heating conductor, wherein first control equipment is provided in one of two phases of the main transformer on the input side in order to control a voltage or a current, second control equipment is provided in one end of a primary coil of the teaser transformer on the input side in order to control a voltage or a current, and the first control equipment and the second control equipment control an output voltage of the main transformer and an output voltage of the teaser transformer individually.

Owing to such a configuration, the first control equipment provided in one of two phases of the main transformer on the input side and the second control equipment provided in the primary coil of the teaser transformer on the input side control an output voltage of the main transformer and an output voltage of the teaser transformer individually. Therefore, the temperature of superheated steam can be controlled easily while utilizing characteristics of the Scott connected transformer. The device configuration can also be simplified because it is unnecessary to provide two single-phase transformers in the main transformer and the teaser transformer on the output side according to a conventional method.

The present invention provides the first control equipment in one of two phases of the main transformer on the input side, and generates saturated steam by controlling an output voltage of the main transformer applied to the first heating conductor tube. Because both ends of the primary coil of the main transformer are connected to a power supply, the main transformer outputs a voltage corresponding to a turn ratio.

In the state where the primary coil of the teaser transformer is connected to a center point of the primary coil of the main transformer and a current flows into the primary coil of the main transformer from the primary coil of the teaser transformer, even if the first control equipment of the main transformer is set to restrict the flow to the minimum, approximately 66% of an output voltage remains in the main transformer at the maximum relative to an output voltage of the teaser transformer. Here, because the ratio of the quantity of heat to generate saturated steam to the quantity of heat to generate superheated steam at a superheated steam temperature set to 2000° C. is 1.0:1.79, the ratio of current in a single-phase circuit having the first heating conductor tube (i.e. single-phase circuit to generate saturated steam) to a single-phase circuit having the second heating conductor tube (i.e. single-phase circuit to generate superheated steam) is 0.75:1.0, and thus the residue is not a problem. Of course the current ratio required to generate saturated steam becomes larger when the superheated steam temperature is less than 2000° C. where residue is not a problem. Also, heated steam is separated into hydrogen and oxygen at a temperature higher than 2000° C. where there is no superheated steam and thus no area involves a problem of residual current value.

Although an output voltage of the teaser transformer is controlled by the second control equipment provided in the teaser transformer, a current flows into the other phase in which the first control equipment is not provided even if a current flowing into the main transformer is cut off by the first control equipment, and thus the current is not controlled. An output voltage of the teaser transformer also fluctuates due to the first control equipment of the main transformer but a current control is made based on the temperature of the second heating conductor tube (i.e. heating tube for generating superheated steam) and there is no problem.

Further, a use method involves initially setting the amount of superheated steam to generate and once the amount of superheated steam to generate is determined, the quantity of heat required for saturated steam set to a temperature of, for example, 130° C. remains constant and therefore an output voltage of the main transformer does not fluctuate in such a manner as to affect an output voltage of the teaser transformer.

Besides, there is a mechanism such that an output voltage of the main transformer is roughly controlled to a value which does not fluctuate largely and the temperature of superheated steam is finely controlled by the second control equipment of the teaser transformer based on the temperature of the second heating conductor tube (i.e. heating tube for generating superheated steam) in the event of some temperature fluctuation of saturated steam at around 130° C., thereby the temperature of superheated steam is controlled without hindrance.

At least one of the main transformer and the teaser transformer desirably has a primary coil wound around a leg iron core and a secondary coil wound around the leg iron core by being piled on the primary coil.

Then, it is desirable that the secondary coil is made of a hollow conductor tube and constitutes the first heating conductor tube and/or the second heating conductor tube.

This requires no electrical connection between the secondary coil of the transformer and the heating conductor and the superheated steam generator can be configured efficiently.

The primary coil is desirably wound around the leg iron core by being piled on the inside and outside of the secondary coil.

This provides a configuration of holding the secondary coil between the primary coil, where magnetic flux leakage can be reduced with improvement of facility efficiency.

The primary coil is desirably made of a hollow conductor tube and preheats water flowing into the first heating conductor tube.

This allows the application of resistance heat generated in the hollow conductor tube that constitutes the primary coil and heat in the iron core to water, thereby facility efficiency can be improved.

At least one of the leg iron cores of the teaser leg iron core and the common leg iron core is desirably a cylindrical involute iron core formed cylindrically by radially laminating multiple magnetic steel sheets having curvatures curved into an involute shape.

This allows the primary coil (made of a hollow conductor tube) to be wound around the leg iron core in close contact therewith and thus heat generated in the iron core can be used efficiently to preheat water. The circular iron core also has the shortest outer circumferential length in comparison with a rectangular iron core having the same cross-sectional area and therefore the amount of the primary coil (made of a hollow conductor tube) to use can be reduced.

The Scott transformer iron core according to the present invention is further characterized as iron cores for use in the Scott connected transformer, including two main leg iron cores around which Scott connected coils are wound, a common leg iron core serving as a common path for magnetic fluxes generated in the two main leg iron cores, and a yoke iron core for connecting the two main leg iron cores and the common leg iron core at the top and bottom, wherein the two main leg iron cores and the common leg iron core are positioned to serve as vertexes of a triangle in a plan view and the yoke iron core is bent at the common leg iron core as a bending point in the plan view.

Because such a configuration positions the two main leg iron cores and the common leg iron core to serve as vertexes of a triangle in the plan view and bends the yoke iron core at the common leg iron core as a bending point in the plan view, it is possible to reduce the distance between the two main leg iron cores and reduce the width dimension of the iron cores as a whole without reducing the dimensions of the leg iron cores themselves, thereby achieving space reduction. The width dimension of the Scott connected transformer can also be reduced without making the winding diameter of the coils and thus space reduction can be achieved.

The distance between one of the two main leg iron cores and the common leg iron core is desirably equal to the distance between the other main leg iron core and the common leg iron core.

This makes the length of a magnetic path between one of the two main leg iron cores and the common leg iron core equal to the length of a magnetic path between the other main leg iron core and the common leg iron core, thereby providing mutual equivalent magnetic characteristics in the two main leg iron core and allowing efficient conversion from a three-phase AC power supply to two single-phase circuits.

It is desirable that the two main leg iron cores and the common leg iron core are positioned to serve as vertexes of a right triangle in a plan view and the common leg iron core is positioned at a top of a vertex of a right angle of the right triangle.

This enables reduction of the distance between the two main leg iron cores and reduction of the width dimension of the iron cores as a whole, thereby space reduction can be achieved.

At least one of the two main leg iron cores is desirably a cylindrical involute iron core formed cylindrically by radially laminating multiple magnetic steel sheets having curvatures curved into an involute shape.

This enables the reduction of heat generated in the main leg iron cores themselves because eddy current loss is small in the involute iron core with a substantially circular cross section.

The yoke iron core includes desirably a deformed wound iron core.

In this configuration, an abutting part to the leg iron core with a substantially circular cross section can be provided in the same circular shape.

The Scott connected transformer using the iron cores for Scott connected transformer according to the present invention is desirably a single-wound transformer where a primary coil and a secondary coil to be wound around at least one of the main leg iron cores include a single coil.

The primary coil and the secondary coil are thus provided in single wound connection to enable simplifying insulation between the primary coil and the secondary coil and make the fabrication easier with reduction of accident risk.

Advantageous Effects of Invention

The present invention is thus configured to enable simplification of the device configuration in the power supply device using the Scott connected transformer and individual control of an output voltage of the main transformer and an output voltage of the teaser transformer while utilizing output characteristics of the respective transformers when the Scott connected transformer has the control equipment arranged on the input side thereof.

DESCRIPTION OF EMBODIMENT

One embodiment of a superheated steam generator using a power supply device according to the present invention is explained below with reference to the drawings.

Figure 1:
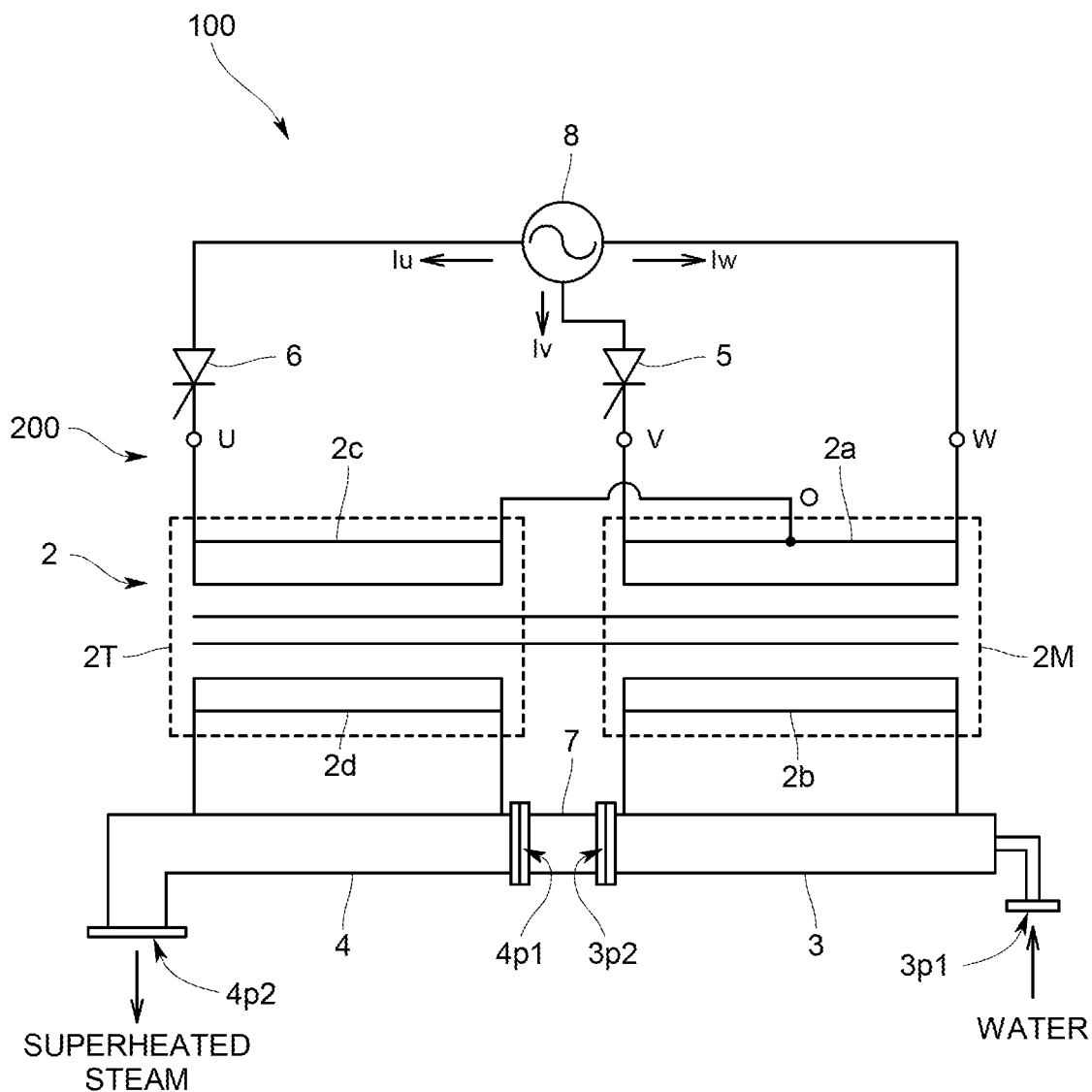
FIG. 1 illustrates a schematic configuration of superheated steam generator according to the present embodiment.

A superheated steam generator 100 according to the present embodiment generates heated steam by electrically heating a heating conductor tube through which a fluid flows and has, as shown in FIG. 1, a power supply device 200 including a Scott connected transformer 2 that transforms a three-phase alternative current supplied from a three-phase AC power supply 8 to two single-phase alternate currents, and a first heating conductor tube 3 and a second heating conductor tube 4 that are electrically heated by the two-phase alternate currents supplied from the Scott connected transformer 2.

The Scott connected transformer 2 includes a main transformer 2M and a teaser transformer 2T. An iron core of the main transformer 2M and an iron core of the teaser transformer 2T are also formed integrally in the present embodiment.

Figure 3:
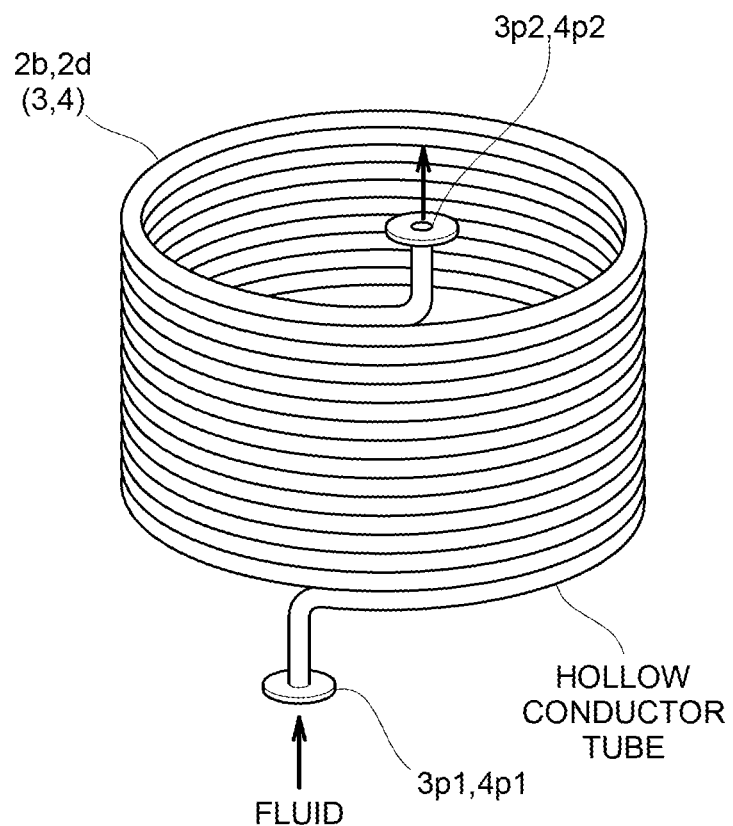
FIG. 3 illustrates a perspective view of a configuration of heating conductor tube according to the present embodiment.

The first heating conductor tube 3 is connected to the output of the main transformer 2M of the Scott connected transformer 2 and electrically heated through application of a voltage outputted from the main transformer 2M, where a fluid inlet port $3p1$ and a fluid outlet port $3p2$ are provided. Water is introduced from the fluid inlet port $3p1$ and saturated steam is derived from the fluid outlet port $3p2$. The first heating conductor tube 3 of the present embodiment includes a secondary coil $2b$ that is made of a hollow conductor tube shown in FIG. 3 in the main transformer 2M. Thus, no electrical connection is required between the secondary coil $2b$ of the main transformer 2M and the first heating conductor tube 3 and the superheated steam generator 100 can be configured efficiently.

Figure 2:
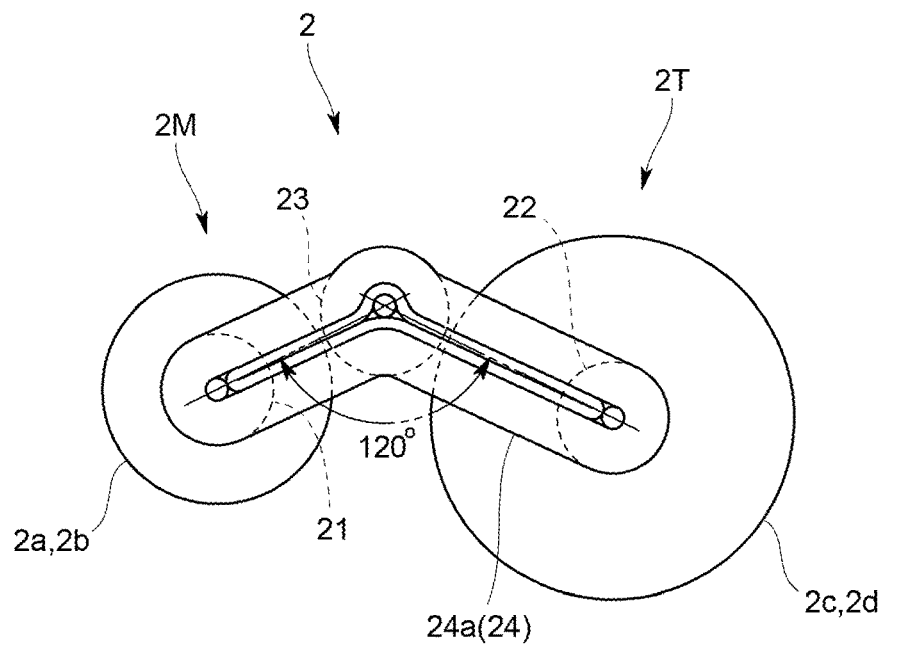
FIG. 2 illustrates a plan view and a front view of a schematic configuration of a Scott connected transformer according to the present embodiment.
Figure 2:
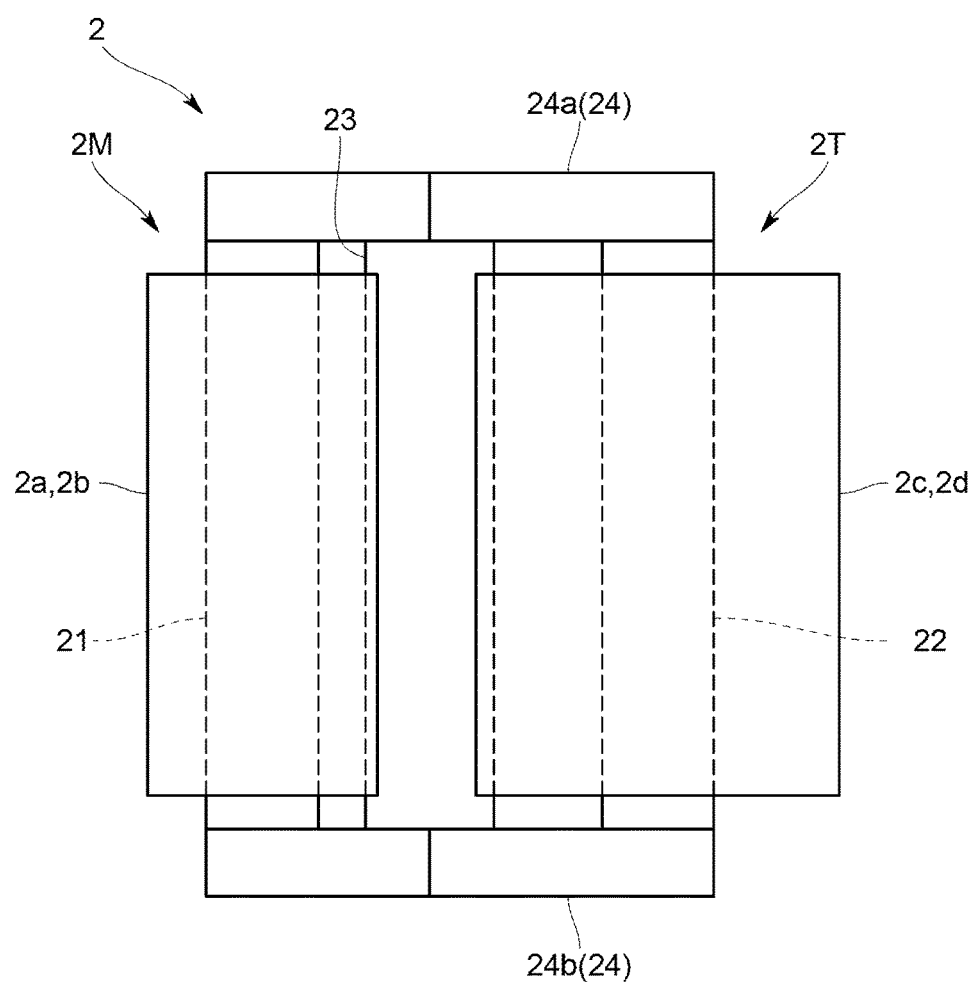

The second heating conductor tube 4 is connected to the output side of the teaser transformer 2T of Scott connected transformer 2 and electrically heated through application of a voltage outputted from the teaser transformer 2T, where a fluid inlet port $4p1$ and a fluid outlet port $4p2$ are provided. Saturated steam generated in the first heating conductor tube 3 is introduced from the fluid inlet port $4p1$ and superheated steam heated to a predetermined temperature is extracted from the fluid outlet port $4p2$. The second heating conductor tube 4 of the present embodiment includes a secondary coil $2d$ that is made of a hollow conductor tube shown in FIG. 3 in the teaser transformer 2T. Thus, no electrical connection is required between the secondary coil $2d$ of the teaser transformer 2T and the second heating conductor tube 4 and the superheated steam generator 100 can be configured efficiently. In FIG. 2, note that the fluid inlet port $4p1$ of the second heating tube 4 is connected to the fluid outlet port $3p2$ of the first heating conductor tube 3 via an intermediate connection tube 7 made of an insulating material.

The Scott connected transformer 2 of the present embodiment has, as shown in FIG. 2, a first main leg iron core (i.e. main leg iron core 21) around which a primary winding (hereinafter referred to as a main primary coil $2a$) and a secondary winding (hereinafter referred to as a main secondary coil $2b$) of the main transformer 2M are wound, a secondary main leg iron core (i.e. teaser leg iron core 22) around which a primary winding (hereinafter referred to as a teaser primary coil $2c$) and a secondary winding (hereinafter referred to as a teaser secondary coil $2d$) of the teaser transformer 2T are wound, a common leg iron core 23 serving as a common path for magnetic fluxes generated in the two main iron cores 21 and 22, and a yoke iron core 24 by which the two main leg iron cores 21 and 22 are connected to the common leg iron core 23 at the top and bottom.

Both ends of the main primary coil 2a are connected to two phases (e.g. V phase and W phase) out of three phases (U phase, V phase, and W phase). One end of the teaser primary coil 2c is also connected to a middle point of the main primary coil 2a and the other end of the teaser primary coil 2c is connected to one phase (e.g. U phase) that is left in the three phases without being connected to the main primary coil 2a. More specifically, one end of the teaser primary coil 2c is connected to a position N/2 of the main primary coil 2a where the number of turns of the teaser primary coil 2c is ($\sqrt{3}/2$) N with respect to even-numbered turns N of the main primary coil 2a.

The main leg iron core 21, the teaser leg iron core 22 and the common leg iron core 23 are configured by an involute iron core that is formed cylindrically with a substantially circular cross section by radially laminating multiple magnetic steel sheets having curvatures curved into an involute shape. Then, the main leg iron core 21 and the teaser leg iron core 22 have the same dimensions where a cross-sectional area S1 of the main leg iron core 21 is equal to a cross-sectional area S2 of the teaser leg iron core 22. The common leg iron core 23 also has a cross-sectional area that is $\sqrt{2}$ times the cross sectional areas S1 and S2 of the main leg iron core 21 and the teaser leg iron core 22, respectively. More specifically, as shown in FIG. 2, the common leg iron core 23 has a diameter that is $(\sqrt{2})^{0.5}$d where d is the diameter of the main leg iron core and the teaser leg iron core.

Furthermore, the main leg iron core 21, the teaser leg iron core 22, and the common leg iron core 23 are positioned to serve as vertexes of a triangle in a plan view when the Scott connected transformer 2 is seen from the above. In the present embodiment, in the plan view, an angle made by a line connecting the center of the main leg iron core 21 and the center of the common leg iron core 23 and a line connecting the center of the teaser leg iron core 22 and the center of the common leg iron core 23 is approximately 120 degrees. The present embodiment also provides the secondary coils 2b and 2d made of a hollow conductor tube and makes the distance between centers of the main leg iron core 21 and the common leg iron core 23 different from the distance between centers of the teaser leg iron core 22 and the common leg iron core 23. More specifically, the distance between centers of the teaser leg iron core 22 and the common leg iron core 23 is longer. This is because a heat insulating material is used to wrap the hollow conductor tube for the secondary coil of the teaser transformer 2T that is brought to a high temperature for generation of superheated steam and therefore the teaser transformer 2T has a large winding diameter.

The yoke iron core 24 includes a deformed wound iron core and has an upper yoke iron core 24a that connects upper surfaces of the main leg iron core 21, the teaser leg iron core 22, and the common leg iron core 23, and a lower yoke iron core 24b that connects lower surfaces of the main leg iron core 21, the teaser leg iron core 22, and the common leg iron core 23. The upper yoke iron core 24a and the lower yoke iron core 24b are bent at the common leg iron core 23 as a bending point in the plan view. Each of the yoke iron cores 24a and 24b in the present embodiment is bent to form an L shape with the center of the common leg iron core 23 as a bending point. More specifically, the upper yoke iron core 24a and the lower yoke iron core 24b are configured to make a bending angle of 120 degrees.

The Scott transformer iron core is thus configured by positioning the main leg iron cores 21 and 22 and the common leg iron core 23 to serve as vertexes of a triangle in the plan view and bending the yoke iron core 24 to form an L shape with the common leg iron core 23 as a center, thereby reducing the distance of the main leg iron cores 21 and 22 and the width dimension of the iron cores as a whole to achieve space reduction.

The power supply device 200 of the present embodiment has first control equipment 5 provided in one of two phases of the main transformer 2M on the input side in order to control a voltage or a current, as shown in FIG. 1. Note that FIG. 1 shows a semiconductor control element such as a thyristor to serve as the first control equipment 5 in the V phase of the main transformer 2M on the input side. Second control equipment 6 is also provided in one end of the primary coil 2c of the teaser transformer 2T on the input side (or U phase side or middle point O side of the teaser primary coil 2c) in order to control a voltage or a current. Similar to the first control equipment 5, a semiconductor control element such as thyristor is also used for the second control equipment 6. Then, a controller not shown controls the first control equipment 5 and the second control equipment 6 with the use of the temperature of the first heating conductor tube 3 and the temperature of the second heating conductor tube 4, thereby individually controlling an output voltage of the main transformer 2M applied to the first heating conductor tube 3 and an output voltage of the teaser transformer 2T applied to the second heating conductor tube 4. Note that the controller obtains the temperature of the first heating conductor tube 3 from a temperature sensor provided in the first heating conductor tube 3 and obtains the temperature of the second heating conductor tube 4 from a temperature sensor provided in the second heating conductor tube 4.

The power supply device 200 of the above configuration causes the first control equipment 5 and the second control equipment 6 to individually control an output voltage of the main transformer 2M and an output voltage of the teaser transformer 2T, respectively, in a state of being connected to a load that constantly requires an output voltage of k×n1/n2 or more in the main transformer 2M relative to an output voltage of the teaser transformer 2T, where n1 is the number of turns of the main secondary coil 2b, n2 is the number of turns of the teaser secondary coil 2d, and k is a coefficient obtained from the exciting impedance of the main transformer 2M and the exciting impedance of the teaser transformer 2T.

In the present embodiment, the first control equipment 5 is provided in one of the two phases of the main transformer 2M on the input side and an output voltage of the main transformer 2M applied to the first heating conductor tube 3 is controlled to generate saturated steam. Both ends of the primary coil 2a of the main transformer 2M are connected to the power supply 8 and thus the main transformer 2M outputs a voltage corresponding to a turn ratio.

On the other hand, the primary coil 2c of the teaser transformer 2T is connected to the center point of the primary coil 2a of the main transformer 2M and a current flows into the primary coil 2a of the main transformer 2M from the primary coil 2c of the teaser transformer 2T. Therefore, even if the first control equipment 5 of the main transformer 2M is set to restrict the flow to the minimum (or cut off the V phase), an output voltage of k×n1/n2 (approximately 66% at the maximum) remains in the main transformer 2M relative to an output voltage of the teaser transformer 2T. Here, the residue is not a problem because the ratio of the quantity of heat to generate saturated steam to the quantity of heat to generate superheated steam at a superheated steam temperature set to 2000° C. is 1.0:1.79 and thus the ratio of current in a single-phase circuit having the first heating conductor tube 3 (i.e. single-phase circuit to generate saturated steam) to a single-phase circuit having the second heating conductor tube 4 (i.e. single-phase circuit to generate superheated steam) is 0.75:1.0. Of course, the ratio of current required to generate saturated steam becomes larger when the superheated steam temperature is less than 2000° C., where its residue is not a problem. At a temperature higher than 2000° C., heated steam is separated into hydrogen and oxygen with no presence of superheated steam and thus no problem arises in connection with a residual current value in entire areas.

Although an output voltage of the teaser transformer 2T is controlled by the second control equipment 6 of the teaser transformer 2T, a current flowing into the main transformer 2M is not controlled even if it is cut off by the first control equipment 5 because a current flows into the other phase where the first control equipment 5 is not provided. Also, fluctuation of an output voltage of the teaser transformer 2T caused by the first control equipment 5 of the main transformer 2M is not a problem because of a current control based on the temperature of the second heating conductor tube 4 (superheated steam generating heating tube).

Furthermore, a method for using the superheated steam generator 100 involves initially setting the amount of superheated steam to generate and once the amount of superheated steam to generate is determined, the quantity of heat required for saturated steam set to a temperature of, for example, 130° C. remains constant and therefore an output voltage of the main transformer 2M does not fluctuate in such a manner as to affect an output voltage of the teaser transformer 2T.

In addition, there is a mechanism such that an output voltage of the main transformer 2M is roughly controlled to a value which does not fluctuate largely and the temperature of superheated steam is controlled in detail by the second control equipment 6 of the teaser transformer 2T based on the temperature of the second heating conductor tube 4 (or heating tube for generating superheated steam) in the event of some temperature fluctuation of saturated steam at around 130° C., thereby the temperature of superheated steam is controlled without hindrance.

Figure 4:
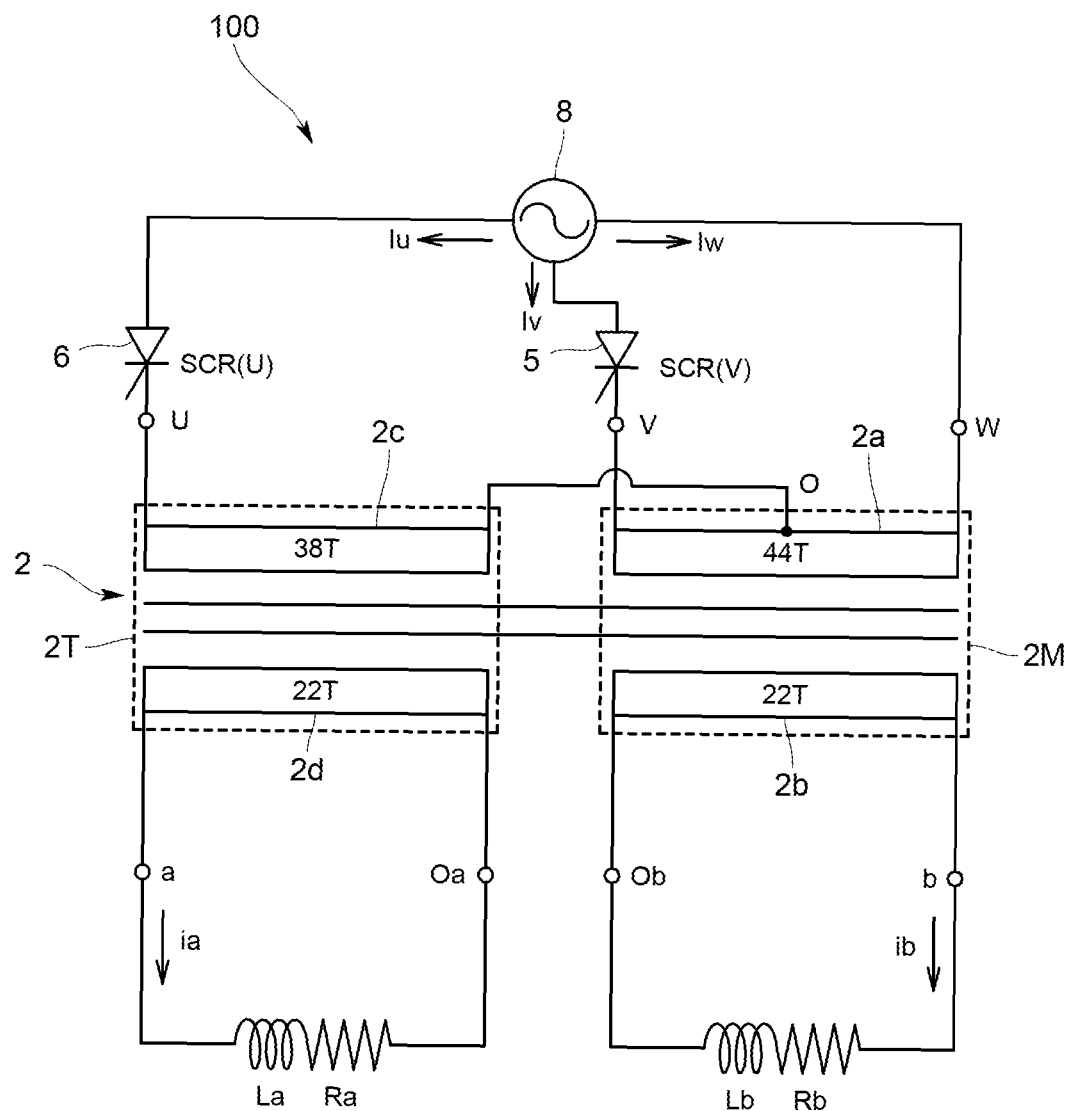
FIG. 4 illustrates a testing device having a circuit equivalent to that of the superheated steam generator.

Next, test results using a testing device having a circuit equivalent to that of the superheated steam generator 100 as shown in FIG. 4 are explained. Note that the main primary coil 2a has 44 turns and the teaser primary coil 2c has 38 turns while the number of turns n1 and n2 of the secondary coils 2b and 2d of the transformer 2M and 2T is 22, respectively.

The following Table 1 shows voltages and currents detected in respective areas when the V phase is cut off by the first control equipment 5 and an input voltage (Eu-w(V)) is varied by the second control equipment 6.

Here, this test is conducted with a high secondary resistance of 0.16Ω in both a-Oa and b-Ob circuits in the transformers and therefore an output voltage is reduced without corresponding to a turn ratio. The following Table 2 shows Eu-o(V), Eo-w(V), output voltages of the teaser transformer (Ea-$o_a$(V)), and output voltages of the main transformer (Eb-$o_b$(V)) obtained by correcting a voltage reduction resulting from the secondary winding resistance.

TABLE 2

| Eu-o (V) | Eo-w (V) | Ea-$o_a$ (V) | Eb-$o_b$ (V) | Main/Teaser |
|---|---|---|---|---|
| 73.2 | 27.9 | 42.4 | 27.9 | 0.658 |
| 90.3 | 34.1 | 52.3 | 34.1 | 0.652 |
| 114.4 | 43.1 | 66.2 | 43.1 | 0.651 |

As shown in the Table 2, it is understood that approximately 66% of an output voltage remains in the main transformer 2M relative to an output voltage of the teaser transformer 2T when the V phase is cut off by the first control equipment 5 and Eu-w(V) is varied by the second control equipment 6.

Here, 158 (V) in the Eu-w column of Table 1 is shared by voltages 114.4 (V) and 43.1 (V) of u-o and o-w sections in the primary coil without corresponding to a turn ratio of 38 T and 22 T, respectively. This is because the main transformer 2M and the teaser transformer 2T are provided with different magnetic circuits even though their iron cores are formed integrally to share the common leg iron core and thus they do not have the same shared voltage per T. Eu-w (V) is shared according to the ratio of respective exciting impedance therein and exciting impedance is determined by the length of magnetic path, magnetic flux density, gap length, turns, etc. That is, the ratio of a remaining output voltage of the main transformer 2M to an output voltage of the teaser transformer 2T corresponds to the ratio of exciting impedance obtained when turns of the main primary coil 2a of the main transformer 2M are halved to exciting impedance of the teaser transformer 2T.

Next, the following Table 3 shows voltage and currents in respective areas when an input voltage ($E_{V-W}$(V)) of the main transformer 2M is varied by the first control equipment 5 while maintaining a control current at a constant level ($E_{u-w}$(V)≈158 (V)) by the second control equipment 6.

TABLE 1

| Eu-o (V) | Eu-v (V) | Ev-w (V) | Eu-w (V) | Eo-w (V) | Iu (A) | Iv (A) | Iw (A) | Ea-$o_a$ (A) | ia (A) | Eb-$o_b$ (V) | ib (A) |
|---|---|---|---|---|---|---|---|---|---|---|---|
| 0.0 | 0.0 | 0.0 | 0.0 | 0.0 | 0.0 | 0.0 | 0.0 | 0.0 | 0.0 | 0.0 | 0.0 |
| 73.2 | 46.0 | 55.2 | 100.1 | 27.9 | 13.0 | 0.0 | 13.0 | 50.2 | 18.8 | 26.8 | 10.8 |
| 90.3 | 56.9 | 68.4 | 124.4 | 34.1 | 19.3 | 0.0 | 19.3 | 54.8 | 28.3 | 33.0 | 16.1 |
| 114.4 | 71.9 | 86.2 | 158.0 | 43.1 | 29.1 | 0.0 | 29.0 | 62.0 | 43.0 | 41.2 | 24.0 |

TABLE 3

| Eu-o (V) | Eu-v (V) | Ev-w (V) | Eu-w (V) | Eo-w (V) | Iu (A) | Iv (A) | Iw (A) | Ea-$o_a$ (V) | ia (A) | Eb-$o_b$ (V) | ib (A) |
|---|---|---|---|---|---|---|---|---|---|---|---|
| 114.4 | 72.0 | 86.4 | 158.0 | 43.2 | 28.8 | 0.0 | 28.7 | 62.1 | 42.6 | 41.4 | 24.1 |
| 125.1 | 104.2 | 99.2 | 159.0 | 49.9 | 30.5 | 10.3 | 27.4 | 67.7 | 45.3 | 47.9 | 23.6 |
| 133.8 | 132.8 | 124.4 | 158.4 | 62.6 | 32.3 | 22.0 | 29.4 | 71.5 | 49.2 | 59.5 | 34.0 |
| 134.6 | 153.3 | 155.9 | 156.4 | 78.2 | 35.3 | 34.9 | 35.3 | 71.9 | 52.5 | 73.7 | 53.0 |

As shown in Table 3, an input voltage ($E_{V-W}(V)$) of the main transformer 2M is varied to approximately 1.8 times by the first control equipment 5, thereby an output voltage (Ea-$o_a$(V)) of the teaser transformer 2T results in fluctuating by approximately 18%.

Next, the following Table 4 shows voltages and currents in respective areas when an input voltage ($E_{U-W}(V)$) is varied by the second control equipment 6 while maintaining a control current at a constant level ($E_{U-W}(V)\approx 158$ (V)) by the first control equipment 5.

TABLE 4

| Eu-o (V) | Eu-v (V) | Ev-w (V) | Eu-w (V) | Eo-w (V) | Iu (A) | Iv (A) | Iw (A) | Ea-$o_a$ (V) | ia (A) | Eb-$o_b$ (V) | ib (A) |
|---|---|---|---|---|---|---|---|---|---|---|---|
| 0.0 | 79.2 | 158.3 | 79.0 | 79.5 | 0.0 | 31.0 | 30.8 | 0.0 | 1.4 | 74.3 | 53.1 |
| 57.1 | 92.5 | 158.2 | 102.8 | 79.0 | 7.6 | 30.0 | 31.8 | 36.7 | 11.0 | 74.3 | 52.8 |
| 88.7 | 112.3 | 157.3 | 125.5 | 78.7 | 17.2 | 30.5 | 33.5 | 53.3 | 25.2 | 74.0 | 53.3 |
| 135.4 | 155.6 | 157.8 | 158.6 | 78.9 | 36.2 | 35.9 | 36.4 | 73.0 | 53.9 | 74.2 | 54.1 |

As shown in Table 4, the results shows an output voltage (Eb-$o_b$(V)) of the main transformer 2M is not affected by variations of an output voltage (Ea-$o_a$(V)) of the teaser transformer 2T.

Next, the following Table 5 shows voltages and currents in respective areas when an input voltage ($E_{V-W}(V)$) of the main transformer 2M is varied by the first control equipment 5 while maintaining a voltage between U and O is maintained at a constant level ($\approx 101$ (V)) by the second control equipment 6.

TABLE 5

| Eu-o (V) | Eu-v (V) | Ev-w (V) | Eu-w (V) | Eo-w (V) | Iu (A) | Iv (A) | Iw (A) | Ea-$o_a$ (V) | ia (A) | Eb-$o_b$ (V) | ib (A) |
|---|---|---|---|---|---|---|---|---|---|---|---|
| 101.3 | 63.6 | 76.3 | 139.2 | 38.2 | 22.9 | 0.0 | 22.8 | 59.4 | 33.5 | 36.7 | 19.0 |
| 101.4 | 88.9 | 98.9 | 132.7 | 49.6 | 21.8 | 9.8 | 22.3 | 58.4 | 31.3 | 47.7 | 22.2 |
| 100.1 | 94.7 | 124.8 | 130.2 | 62.8 | 20.7 | 19.6 | 26.1 | 59.4 | 30.6 | 59.9 | 35.1 |
| 100.9 | 120.7 | 157.8 | 133.6 | 78.8 | 21.0 | 30.8 | 33.8 | 60.0 | 31.6 | 74.2 | 52.7 |

As shown in the Table 5, the result shows an output voltage of the teaser transformer 2T (Ea-$o_a$(V)) is maintained at a constant level and an input voltage (Eb-$o_b$(V)) of the main transformer 2M is controlled.

Figure 5:
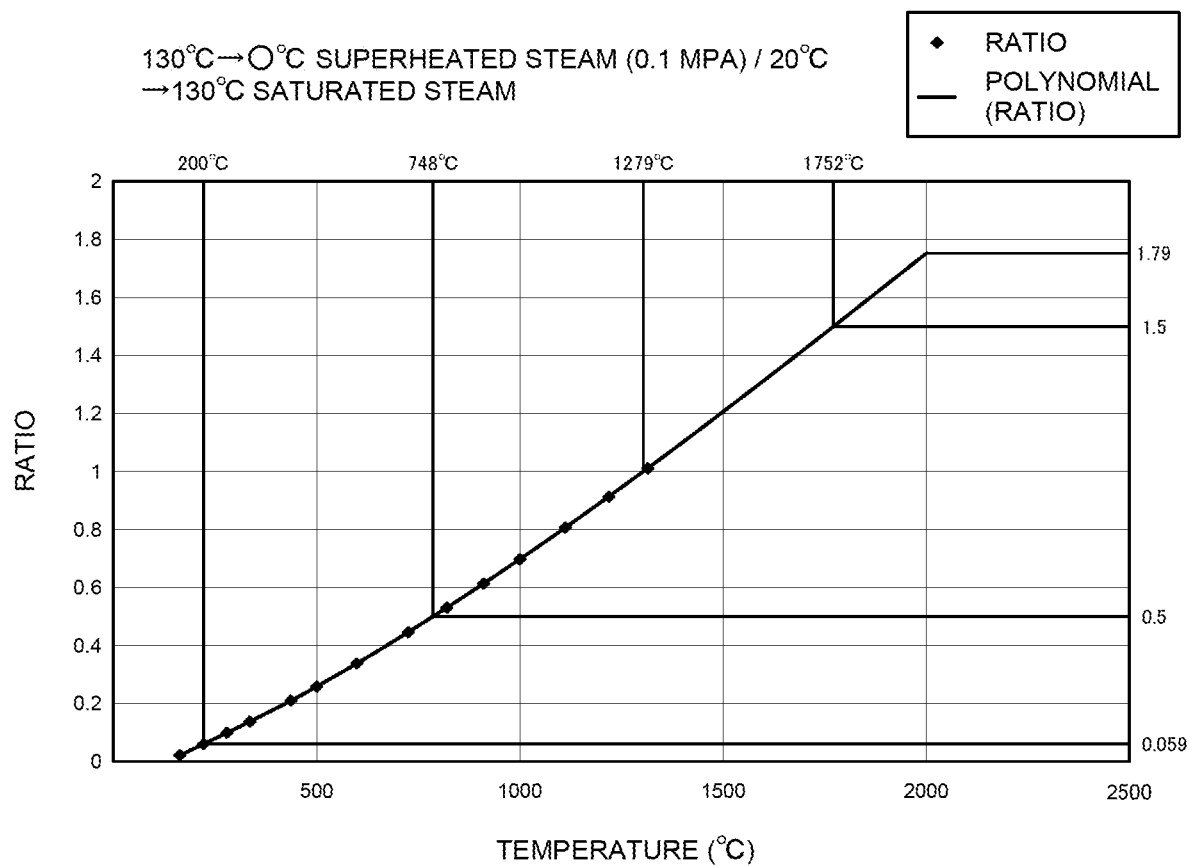
FIG. 5 illustrates a characteristic graph showing a relationship between the quantity of heat to generate superheated steam and the temperature of superheated steam.

Here, FIG. 5 illustrates a characteristic graph showing a relationship between the quantity of heat to generate superheated steam and the temperature of superheated steam where the quantity of heat to generate saturated steam is 1.

The ratio is 0.059 at a heated steam temperature of 200° C., 0.5 at 748° C., 1.0 at 1279° C., 1.5 at 1752° C. and 1.79 at 2000° C.

The following Table 6 also shows a relationship between the temperature of superheated steam and current values in the respective phases of the three-phase AC power supply.

TABLE 6

| Superheated steam temperature (° C.) | Current ratio | | |
|---|---|---|---|
| | U phase | V phase | W phase |
| 200 | 0.278 | 1 | 1 |
| 748 | 0.756 | 1 | 1 |
| 1279 | 1 | 1 | 1 |

TABLE 6-continued

| Superheated steam temperature (° C.) | Current ratio | | |
|---|---|---|---|
| | U phase | V phase | W phase |
| 1752 | 1.155 | 1 | 1 |
| 2000 | 1.223 | 1 | 1 |

As understood from Table 6, the current ratio of the respective phases is well balanced at 1:1:1 at a superheated steam temperature of 1279° C. The current ratio of the respective phases is 1.233:1:1 at 2000° C., 0.756:1:1 at 748° C., and 0.278:1:1 at 200° C. Therefore, in a range from the minimum temperature of 200° C. corresponding to superheated steam to the extreme temperature of 2000° C., there is no extremely unbalanced current such that a current value of one phase is zero.

The superheated steam generator 100 of the present embodiment is thus configured by connecting the first heating conductor tube 3 (heating tube for generating saturated steam) to the output of the main transformer 2M and connecting the second heating conductor tube 4 (heating tube for generating superheated steam) to the output of the teaser transformer 2T to provide a state where a load requiring an output voltage of k×n1/n2 or more in the main transformer relative to an output voltage of the teaser transformer is connected. In this state, an output voltages of the main transformer 2M and the teaser transformer 2T are controlled individually by the first control equipment 5 provided in one of the two phases of the main transformer 2M on the input side and the second control equipment 5 provided in the teaser transformer 2T on the input side. Therefore, the temperature of superheated steam is controlled easily while utilizing characteristics of the power circuit 200 having the Scott connected transformer 2. The device configuration can also be simplified because it is unnecessary to provide two single-phase transformers in the main transformer 2M and the teaser transformer 2T on their output side according to a conventional method.

In addition, the iron core of the main transformer 2M and the iron core of the teaser transformer 2T are formed integrally and the main leg iron core 21, the teaser leg iron core 22, and the common leg iron core 23 are positioned to serve as vertexes of a triangle in the plan view with the yoke iron core 24 being bent at the common leg iron core 23 as a bending point in the plan view, thereby reducing the distance between the two main leg iron cores 21 and 22 and the width dimension of the Scott connected transformer 2 as a whole to achieve space reduction. Instead of two sets of transformers, one set thereof can be used to constitute the Scott connected transformer 2 and thus the device can be made compact.

Next, the Scott connected transformer 2 of the present embodiment is explained in detail.

The Scott connected transformer 2 is a transformer to convert a three-phase alternate current sent from the three-phase AC power supply to two single-phase currents and includes the main transformer 2M and the teaser transformer 2T. The main transformer 2M and the teaser transformer 2T are autotransformers where the primary coil and the secondary coil include a single coil, and the iron core of the main transformer 2M and the iron core of the teaser transformer 2T are formed integrally.

Figure 6:
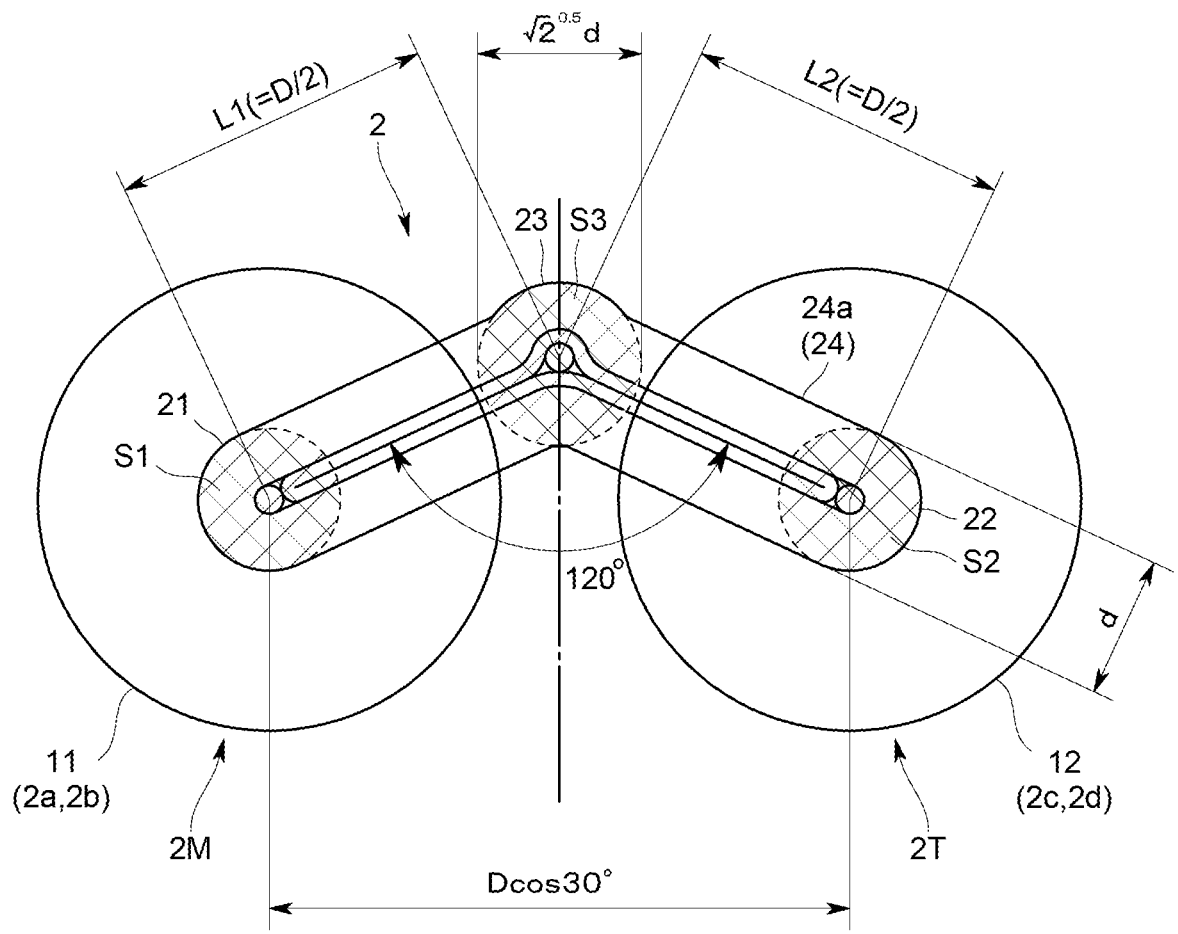
FIG. 6 illustrates a plan view of a schematic configuration of the Scott connected transformer according to the present embodiment.

More specifically, the Scott connected transformer 2 has iron cores as shown in FIG. 6 including the main leg iron cores 21 and 22 around which Scott connected induction coils 11 and 12 are wound, the common leg iron core 23 that serves as a common path for magnetic fluxes generated in the main leg iron cores 21 and 22 and prevents their magnetic fluxes from passing through each other directly, and the yoke iron core 24 that connects the main leg iron cores 21 and 22 and the common leg iron core 23 at the top and bottom.

The main leg iron core 21 as one of the main leg iron cores is a leg iron core around which the induction coil 11 made of the primary winding (i.e. main primary coil 2a) and the secondary winding (i.e. main secondary coil 2b) of the main transformer 2M are wound. Note that the main leg iron core 21 is referenced as one of the main leg iron cores 21 hereinafter. The other main leg iron core 22 is a leg iron core around which the induction coil 12 made of the primary winding (i.e. teaser primary coil 2c) and the secondary winding (i.e. teaser secondary coil 2d) of the teaser transformer 2T are wound. Note that the teaser leg iron core 22 is referenced as the other main leg iron core 22 hereinafter.

Two phases (e.g. V phase and W phase) out of three phases (U phase, V phase and W phase) are connected to both ends of the induction coil 11. One end of the induction coil 12 is connected to a middle point of the induction coil 11 and the other end of the induction coil 12 is connected to one phase (e.g. U phase) that is left in the three phases without being connected to the induction coil 11. More specifically, one end of the induction coil 12 is connected to a position N/2 of the induction coil 11, where the number of turns of the induction coil 12 is $(\sqrt{3}/2)N$ relative to even-numbered turns N of the induction coil 11.

Figure 7:
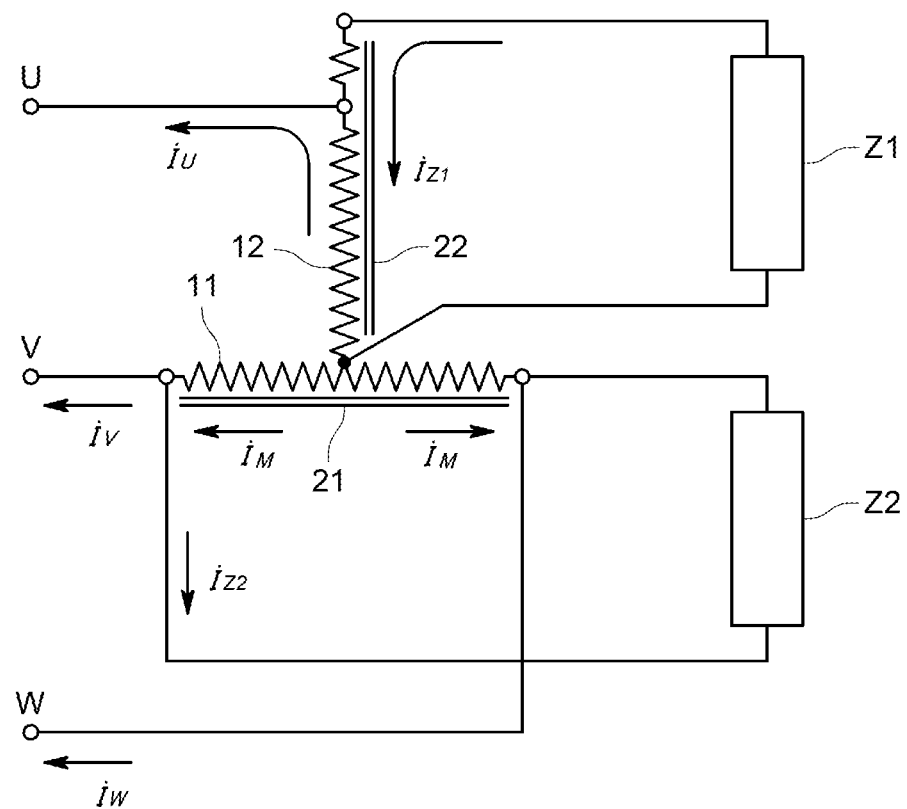
FIG. 7 illustrates a circuit diagram of a schematic configuration of a Scott connected transformer according to a modified embodiment.

As an example of Scott connection in the Scott connected transformer 2 of the present embodiment, it is considered to use turns N for both the induction coil 11 and the induction coil 12. More specifically, as shown in FIG. 7, both ends of the induction coil 11 are connected to V phase and W phase of the three-phase AC power supply and one end of the induction coil 12 is connected to the position N/2 of the induction coil 11. Then, U phase of the three-phase AC power supply is connected to the position $(\sqrt{3}/2)N$ of the induction coil 12. It is thus configured to make a three-phase input voltage come to the same as a single-phase output voltage of two circuits. Further, a load Z1 is connected to both ends of the induction coil 11 and a load Z2 of the same capacity as the load Z1 is connected to both ends of the induction coil 12.

The present embodiment also involves the arrangement of positioning the main leg iron core 21, the teaser leg iron core 22 and the common leg iron core 23 to serve as vertexes of a triangle in the plan view.

Figure 8:
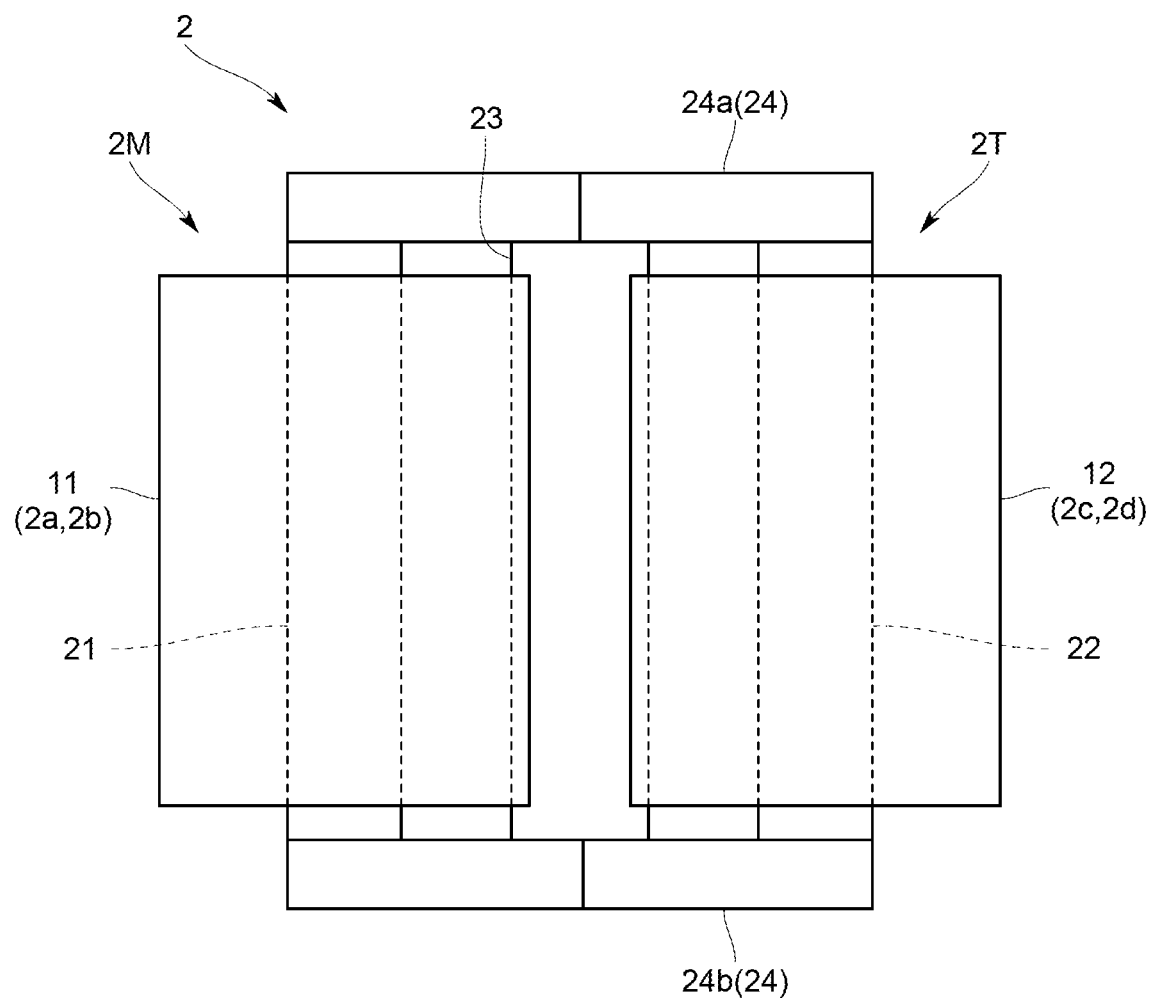
FIG. 8 illustrates a front view of a schematic configuration of the Scott connected transformer according to the modified embodiment.

The main leg iron core 21 and the teaser leg iron core 22 of the present embodiment are leg iron cores with a substantially circular cross section that are spaced apart from each other and extend vertically, as shown in FIG. 6 and FIG. 8. More specifically, the main leg iron core 21 and the teaser leg iron core 22 include an involute iron core that is formed cylindrically with a substantially circular cross section by radially laminating multiple magnetic steel sheets having curvatures curved into an involute shape. The main leg iron core 21 and the teaser leg iron core 22 have the same dimension where the cross-sectional area S1 of the main leg iron core 21 is equal to the cross-sectional area S2 of the teaser leg iron core 22.

The common leg iron core 23 is a leg core extending vertically and having a substantially circular cross section. More specifically, the common leg iron core 23 is similar to the above leg iron cores 21 and 22 and includes an involute iron core that is formed cylindrically with a substantially circular cross section by radially laminating multiple magnetic steel sheets having curvatures curved into an involute shape. The common leg iron core 23 also has the cross-sectional area S3 that is $\sqrt{2}$ times the cross sectional areas S1 and S2 of the main leg iron core 21 and the teaser leg iron core 22, respectively. More specifically, as shown in FIG. 6, the diameter of the common leg iron core 23 is $\sqrt{2}^{0.5}d$ where d is the diameter of the main leg iron core 21 and the teaser leg iron core 22.

The yoke iron core 24 includes a deformed wound iron core and has the upper yoke iron core 24a that connects upper surfaces of the main leg iron core 21, the teaser leg iron core 22, and the common leg iron core 23, and the lower yoke iron core 24b that connects lower surfaces of the main leg iron core 21, the teaser leg iron core 22 and the common leg iron core 23, as shown in FIG. 6 and FIG. 8. The upper yoke iron core 24a and the lower yoke iron core 24b are bent at the common leg iron core 23 as a bending point in the plan view. More specifically, the upper yoke iron core 24a and the lower yoke iron core 24b are bent at the center of the common leg iron core 23 to form an L shape. That is, the upper yoke iron core 24a and the lower yoke iron core 24b are formed symmetric laterally by using the common leg iron core 23 as a center.

In the present embodiment, a distance L1 between centers of the main leg iron core 21 and the common leg iron core 23 is equal to a distance L2 between centers of the teaser leg iron core 22 and the common leg iron core 23. That is, the main leg iron core 21, the teaser leg iron core 22, the common leg iron core 23 are positioned to serve as vertexes of an isosceles triangle in the plan view.

Figure 12:
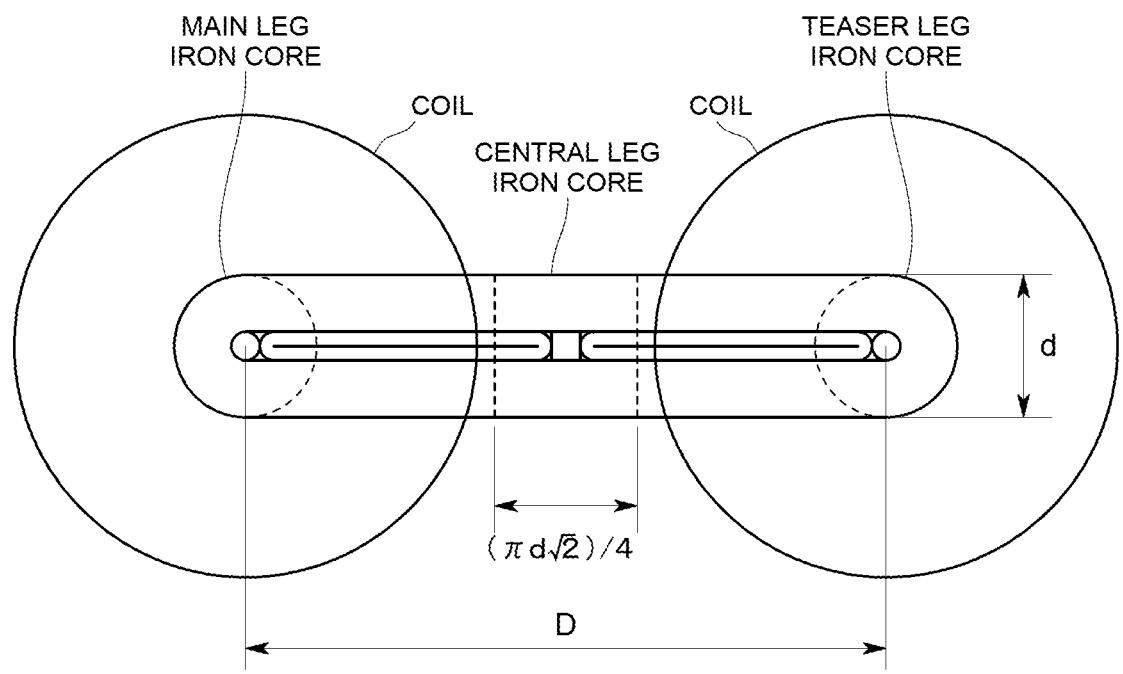
FIG. 12 illustrates a plan view of a schematic configuration of a conventional Scott connected transformer.
Figure 13:
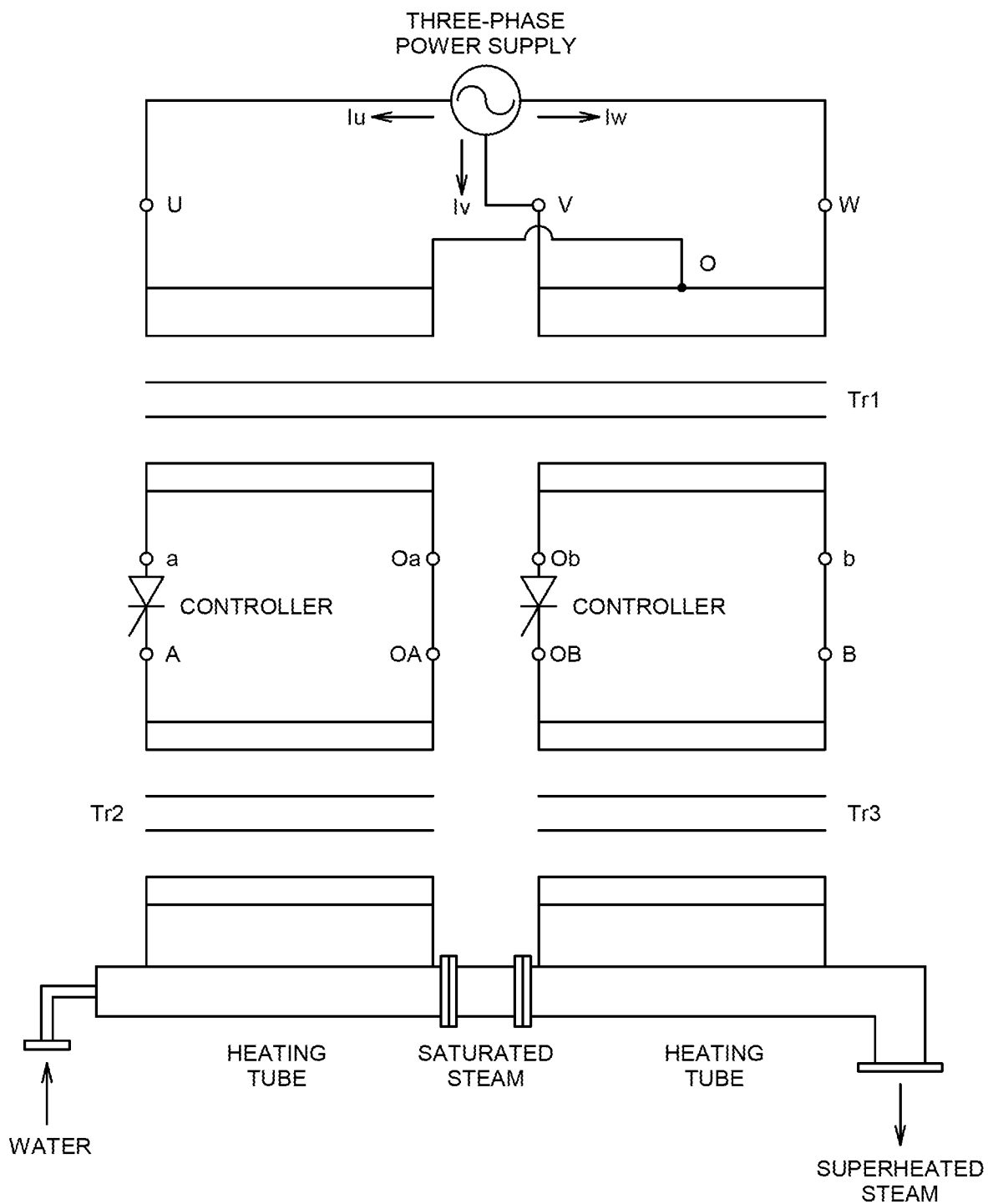
FIG. 13 illustrates a schematic diagram illustrating a configuration of conventional superheated steam generator.

The present embodiment also provides the upper yoke iron core 24a and the lower yoke iron core 24b with a bending angle of 120 degrees. More specifically, in the plan view, an angle made by a line to connect the center of the main leg iron core 21 and the center of the common leg iron core 23 and a line to connect the center of the teaser leg iron core 22 and the center of the common leg iron core 23 is set to approximately 120 degrees. Accordingly, the distance between centers of the main leg iron core 21 and the teaser leg iron core 22 is D cos 30° where the inter-center distance L1 and the inter-center distance L2 are D/2. Here, the difference between distances before and after bending the yoke iron core 24 is an approximate value obtained by D−D cos θ=D (1−cos 30°) where D is the distance between centers of the main leg iron core 21 and the teaser leg iron core 22 before bending. Therefore, the distance is shorter than that of the conventional rectangular iron cores shown in FIG. 12 and obtained as an approximate value by D (1−cos 30°)−d{(√2)$^{0.5}$−(π√2)/4}.

The Scott connected transformer 2 is thus configured by positioning the main leg iron core 21, the teaser leg iron core 22 and the common leg iron core 23 to serve as vertexes of a triangle in the plan view and bending the yoke iron core 24 at the center of the common leg iron core 23 to form an L shape in the plan view, thereby reducing the distance between the main leg iron core 21 and the teaser leg iron core 22 and the width dimension of the iron cores as a whole to achieve space reduction.

The Scott connected transformer 2 of the present embodiment is also characterized by making the distance L1 between centers of the main leg iron core 21 and the common leg iron core 23 equal to the distance L2 between centers of the teaser leg iron core 22 and the common leg iron core 23, and forming the upper yoke iron core 24a and the lower yoke iron core 24b symmetrical laterally with the common leg iron core 23 as a center, thereby making the length of magnetic path between the main leg iron core 21 and the common leg iron core 23 equal to that between the teaser leg iron core 22 and the common leg iron core 23 and thus providing mutually equivalent magnetic characteristics in the main leg iron core 21 and the teaser leg iron core 22, where efficient conversion from the three-phase AC power supply to the two single-phase circuits can be achieved.

Figure 9:
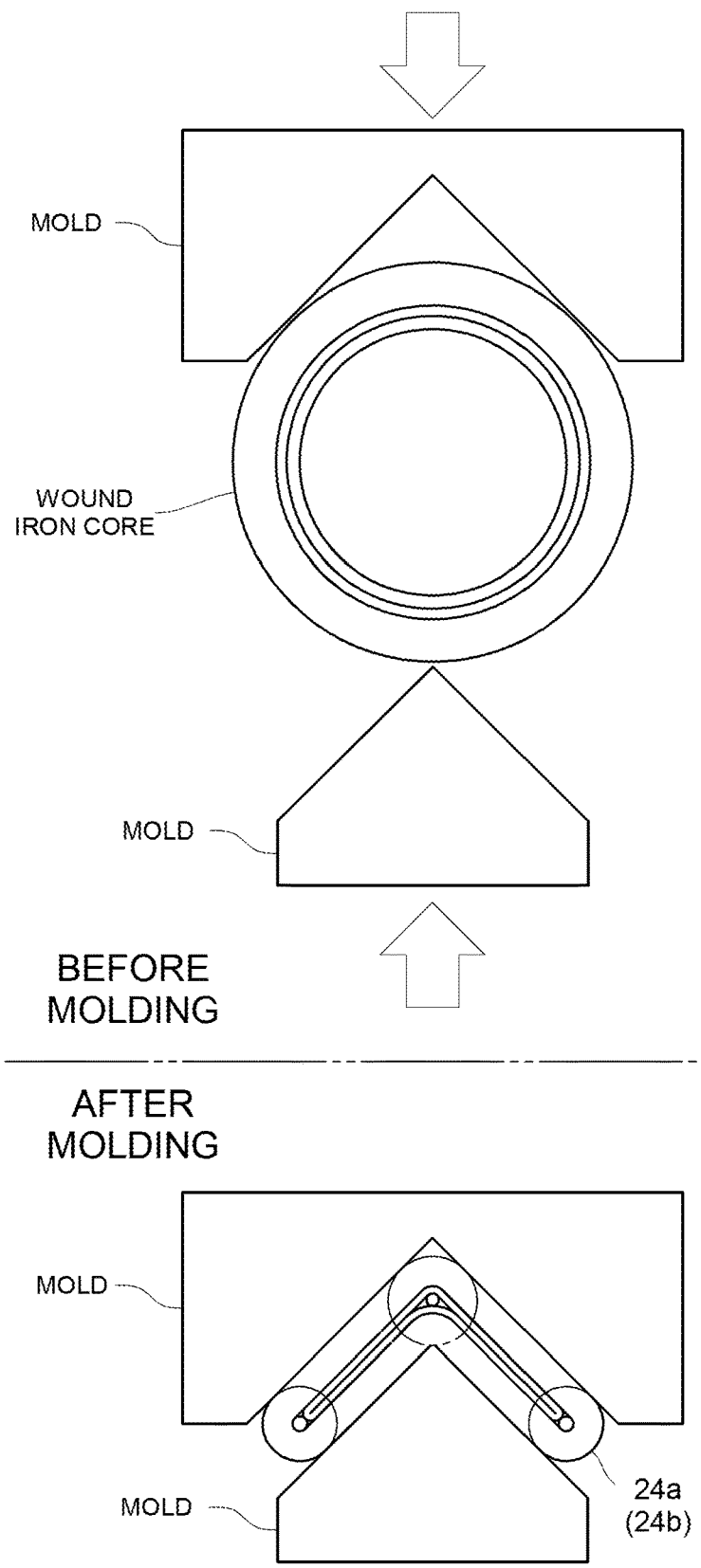
FIG. 9 illustrates a schematic procedure of molding a yoke iron core according to the modified embodiment.

Furthermore, because the Scott connected transformer 2 of the present embodiment provides the upper yoke iron core 24a and the lower yoke iron core 24b bent at the common leg iron core 23 as a center, a machining process for the upper yoke iron core 24a, and the lower yoke iron core 24b can be simplified as shown in FIG. 9. More specifically, a mold formed with a V-shape groove and a mold having a V-shape projection at the tip end are used in one step combining a step to crush a wound iron core into a flat shape and expand it to a predetermined size corresponding to a cross-sectional area of the common leg iron core 23 and a step to bend the wound iron core crushed into a flat shape. Therefore, the processing configuration of the yoke iron core 24 can be simplified substantially.

Note that the present invention is not limited to the above present embodiment.

For example, the present embodiment provides the secondary coils 2b and 2d of the transformer 2M and 2T formed by a hollow conductor tube and the heating conductor tube 3 and 4 including the secondary coils 2b and 2d but the first heating conductor tube 3 and the second heating conductor tube 4 may be electrically heated by being connected to the secondary coils 2b and 2d of the transformers 2M and 2T, respectively. One of the secondary coils of the main transformer 2M and the teaser transformer 2T may also be made of a hollow conductor tube and one of the first heating conductor tube 3 and the second heating conductor tube 4 may also include the secondary coil.

At least one of the main transformer 2M and the teaser transformer 2T may also have the primary coil wound around the leg iron core by being piled on the inside and the outside of the secondary coil. This provides a configuration of holding the secondary coil in the interval of the primary coil, where magnetic flux leakage is reduced with improvement of facility efficiency.

There may be a further configuration where the primary coil includes a hollow conductor tube and water flowing into the first heating conductor tube 3 is preheated. This allows application of resistance heat generated in the hollow conductor tube that constitutes the primary coil and heat in the iron core to water, thereby facility efficiency can be improved.

Further, even though the above embodiment forms the iron core of the main transformer 2M and the iron core of the teaser transformer 2T integrally, different iron cores may also be used for the iron core of the main transformer 2M and the iron core of the teaser transformer 2T.

In addition, the above embodiment may additionally adopt a single-wound transformer for the main transformer 2M and the teaser transformer 2T. This allows simplification of insulation between the primary coil and the secondary coil and realizes easy fabrication with reduction of accident risk.

Moreover, the above configuration makes the distance between centers of the main leg iron core 21 and the common leg iron core 23 different from the distance between centers of the teaser leg iron core 22 and the common leg iron core 23, but the distance between centers of the main leg iron core 21 and the common leg iron core 23 may be equal to the distance between centers of the teaser leg iron core 22 and the common leg iron core 23. That is, the main leg iron core 21, the teaser leg iron core 22 and the common leg iron core 23 may be positioned to serve as vertexes of an isosceles triangle in the plan view and the yoke iron cores 24a and 24b may be formed symmetrical laterally with the common leg iron core 23 as a center. This provides mutually equivalent magnetic characteristics in the two main leg iron cores 21 and 22 and thus enables efficient conversion from the three-phase AC power supply to the two single-phase circuits.

Figure 10:
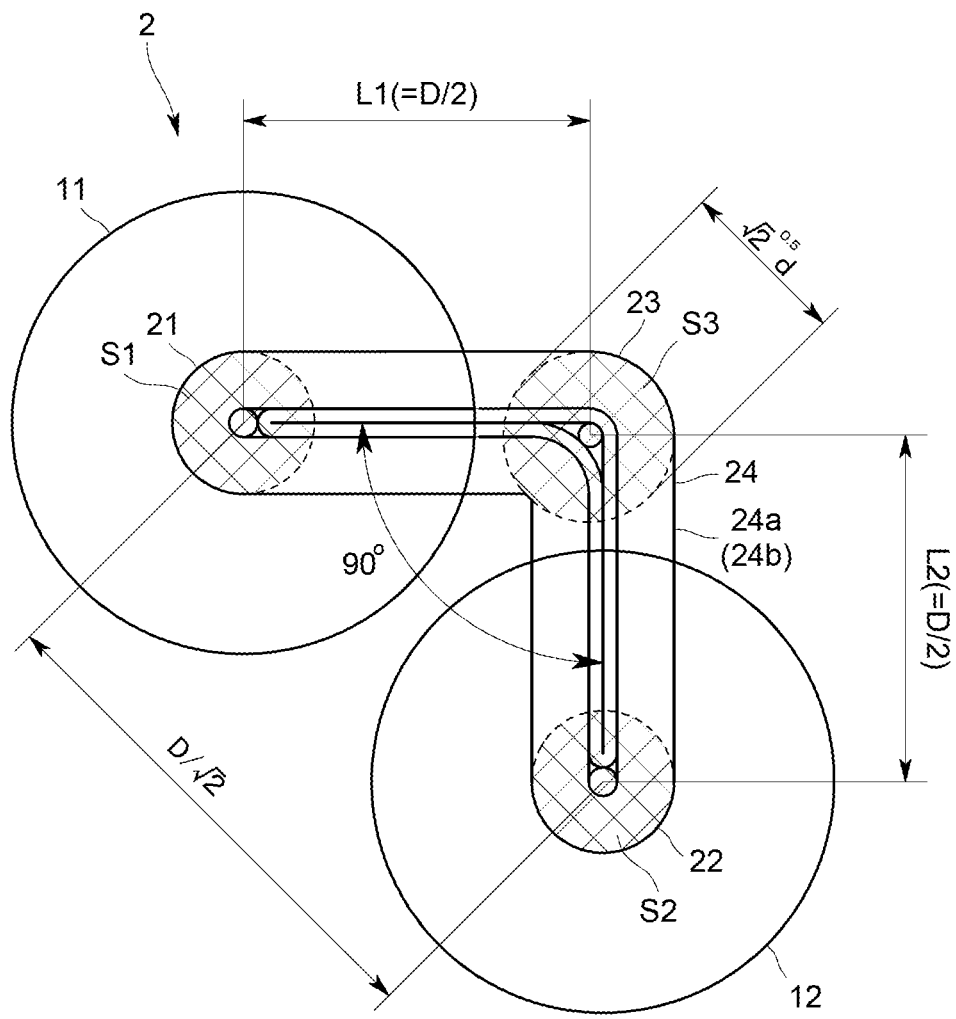
FIG. 10 illustrates a plan view of a schematic configuration of a Scott connected transformer according to a modified embodiment.

Furthermore, an angle made by a line to connect the center of the main leg iron core 21 and the center of the common iron core 23 and a line to connect the center of the teaser leg iron core 22 and the center of the common leg iron core 23 is not limited to 120 degrees. For example, as shown in FIG. 10, the main leg iron core 21, the teaser leg iron core 22 and the common leg iron core 23 may also be positioned to serve as vertexes of a right triangle in a plan view with the common leg iron core 23 positioned at a vertex of a right angle of the right triangle. More specifically, the upper yoke iron core 24a and the lower yoke iron core 24b are bent at an angle of 90 degrees and a substantially right angle is made by a line to connect the center of the main leg iron core 21 and the center of the common leg iron core 23 and a line to connect the center of the teaser leg iron core 22 and the center of the common leg iron core 23. Accordingly, the distance between centers of the main leg iron core 21 and the teaser leg iron core 22 is $D/\sqrt{2}$, where the inter-center distance L1 and the inter-center distance L2 are D/2. This enables reduction of the distance between the main leg iron core 21 and the teaser leg iron core 22 and reduction of the width dimension of the iron cores as a whole. Here, the difference between distances before and after bending the yoke iron core 24 is an approximate value obtained by $D-D/\sqrt{2}=D(1-1/\sqrt{2})$, where D is a distance between centers of the main leg iron core 21 and the teaser leg iron core 22 before bending. Therefore, the distance is shorter than that of the conventional rectangular iron cores shown in FIG. 12 and obtained as an approximate value by $D(1-1/\sqrt{2})-d\{(\sqrt{2})^{0.5}-(\pi\sqrt{2})/4\}$.

Figure 11:
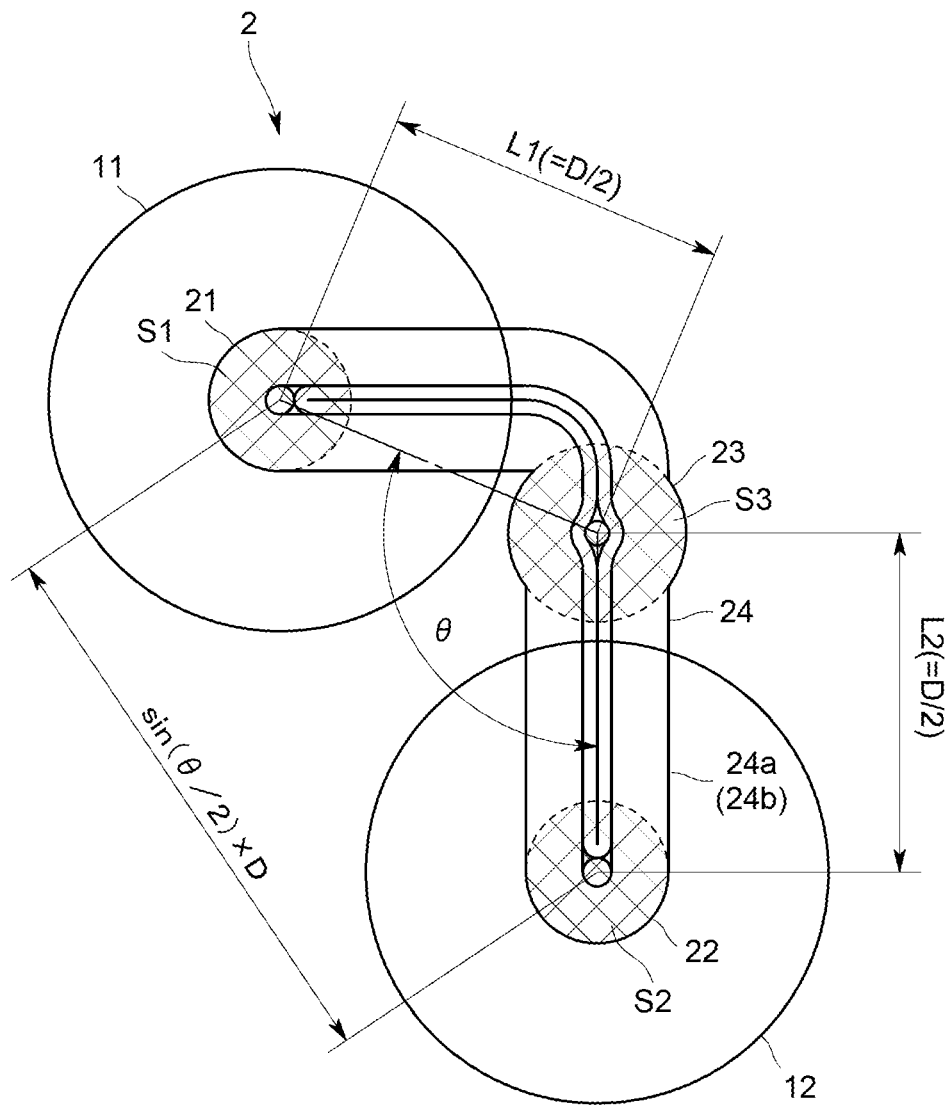
FIG. 11 illustrates a plan view of a schematic configuration of a Scott connected transformer according to a modified embodiment.

It is also possible to consider that the upper yoke iron core 24a and the lower yoke iron core 24b are not bent at the common leg iron core 23 as a bending point as shown in FIG. 11. In this case, the procedure needs to be divided into two steps including a step to crush a wound iron core into a flat shape and expand it to a predetermined size corresponding to a cross-sectional area of the common leg iron core 23 and a step to bend the wound iron core crushed into a flat shape. When the procedure is divided into the expanding step and the bending step, a problem arises such that respective areas are creased and therefore the procedure needs to be devised over many steps. As a result, the upper yoke iron core 24a and the lower yoke iron core 24b are preferably bent at the common leg iron core 23 as a bending point.

Further, the main leg iron core 21, the teaser leg iron core 22 and the common leg iron core 23 are not limited to have a substantially circular cross section and may also have an a cross section of other shapes such as ellipse and polygon.

Additionally, the main transformer 2M and the teaser transformer 2T are not limited to a single-wound transformer and may also be a multiple-wound transformer.

Although the case of adopting the power circuit 200 having the Scott connected transformer 2 to the superheated steam generator 100 was explained in the present embodiment, various loads can also be connected without limitation to the loads made of the first heating conductor tube 3 and the second heating conductor tube 4 as long as a load constantly requires an output voltage of k×n1/n2 or more in the main transformer relative to an output voltage of the teaser transformer.

The present invention is not limited to the above embodiment and various modifications can also be adopted in a range without departing from its gist.

REFERENCE CHARACTER LIST

100 Superheated steam generator
200 Power supply device
2 Scott connected transformer
21 Main leg iron core (Main leg iron core)
22 Teaser leg iron core (Main leg iron core)
23 Common leg iron core
24 Yoke iron core
2M Main transformer
2a Primary coil
2b Secondary coil
2T Teaser transformer
2c Primary coil
2d Secondary coil
3 First heating conductor tube
4 Second heating conductor tube
5 First control equipment
6 Second control equipment

The invention claimed is:

1. An iron core for Scott connected transformer that includes a main transformer and a teaser transformer comprising:
   two main leg iron cores with Scott connected coils wound therearound;
   a common leg iron core serving as a common path for magnetic fluxes generated in the two main leg iron cores and in which a coil is not wound; and
   a yoke iron core for connecting the two main leg iron cores and the common leg iron core at the top and bottom, wherein:
   the two main leg iron cores and the common leg iron core are positioned to serve as vertexes of a triangle in a plan view;
   a first of the two main leg iron cores is wound with a first induction coil including a first primary winding and a first secondary winding of the main transformer;
   a second of the two main leg iron cores is wound with a second induction coil including a second primary winding and a second secondary winding of the teaser transformer;
   the yoke iron core is bent at the common leg iron core as a bending point in the plan view;
   the two main leg iron cores have equal cross-sectional areas; and
   the common leg iron core has a cross-sectional area that is $\sqrt{2}$ times the cross-sectional area of each of the two main leg iron cores.

2. The iron core for Scott connected transformer according to claim 1, wherein the distance between the first of the two main leg iron cores and the common leg iron core is equal to the distance between the second of the two main leg iron cores and the common leg iron core.

3. The iron core for Scott connected transformer according to claim 1, wherein
   the two main leg iron cores and the common leg iron core are positioned to serve as vertexes of a right triangle in a plan view; and
   the common leg iron core is positioned at a vertex of a right angle of the right triangle.

4. The iron core for Scott connected transformer according to claim 1, wherein at least one of the two main leg iron cores is a cylindrical involute iron core formed by cylindrically radially laminating multiple magnetic steel sheets having curvatures curved into an involute shape.

5. The iron core for Scott connected transformer according to claim 1, wherein the yoke iron core includes a deformed wound iron core.

* * * * *